United States Patent [19]
Shiraishi

[11] Patent Number: 5,412,588
[45] Date of Patent: May 2, 1995

[54] DIGITAL SINE-WAVE GENERATING CIRCUIT
[75] Inventor: Mikio Shiraishi, Yokohama, Japan
[73] Assignee: Kabushiki Kaisha Toshiba, Kawasaki, Japan
[21] Appl. No.: 168,368
[22] Filed: Dec. 17, 1993
[30] Foreign Application Priority Data
  Dec. 25, 1992 [JP] Japan .................. 4-347299
[51] Int. Cl.$^6$ .............................................. G06F 1/02
[52] U.S. Cl. .................................................... 364/721
[58] Field of Search ............... 364/721, 718, 724.16,
  364/724.17, 729, 730, 754, 757; 328/14;
  307/271

[56]              References Cited
        U.S. PATENT DOCUMENTS
  4,326,260  4/1982  Gross ....................... 364/718
  4,577,287  3/1986  Chrin ....................... 364/721
  4,843,584  6/1989  Sundaramurthy .......... 364/735
  4,888,719 12/1989  Yassa ....................... 364/721
  4,896,287  1/1990  O'Donnell et al. ........ 364/754
  4,910,698  3/1990  McCartney ............... 364/721

Primary Examiner—Roy N. Envall, Jr.
Assistant Examiner—Emmanuel Moise
Attorney, Agent, or Firm—Banner, Birch, McKie & Beckett

[57]              ABSTRACT

Upon receipt of the sine (sin $\omega$) or the cosine (cos $\omega$) of a digital angular frequency, a multiplier performs predetermined arithmetic operations of multiplication on it. An output of the multiplier is stored in a register. An adder-subtracter performs arithmetic addition or subtraction of the output of the register and an output of the multiplier. The arithmetic results are stored in first and second registers or third and fourth registers. The arithmetic operations performed by the multiplier include arithmetic multiplication of outputs (initial values) of the third and fourth registers by the sine or cosine of the digital angular frequency and arithmetic multiplication of the results of arithmetic operations by the adder-subtracter stored in the first and second registers or the third and fourth registers by the sine or cosine of the digital angular frequency.

22 Claims, 29 Drawing Sheets $T_{ACC}$: ACCESS TIME

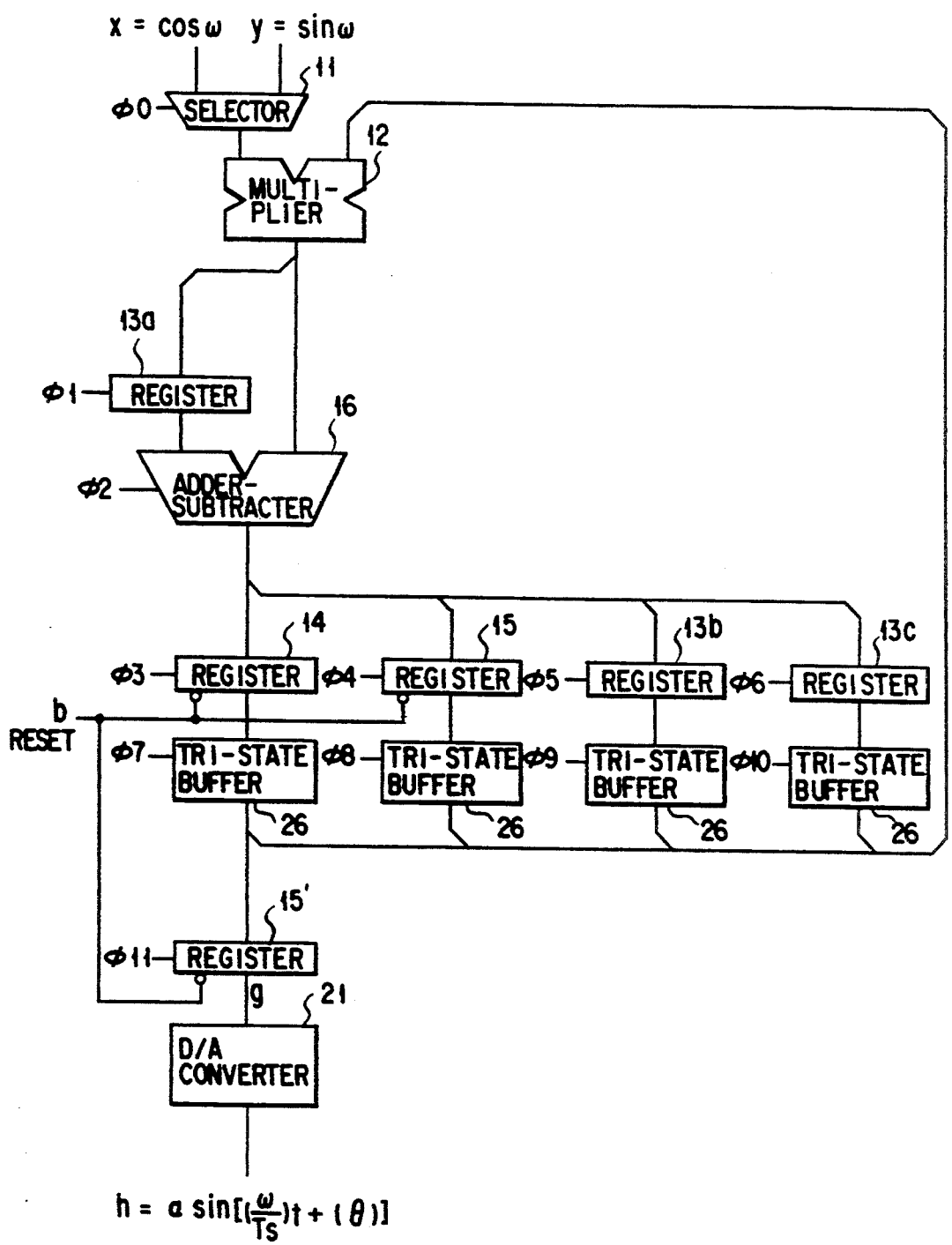
F I G. 5

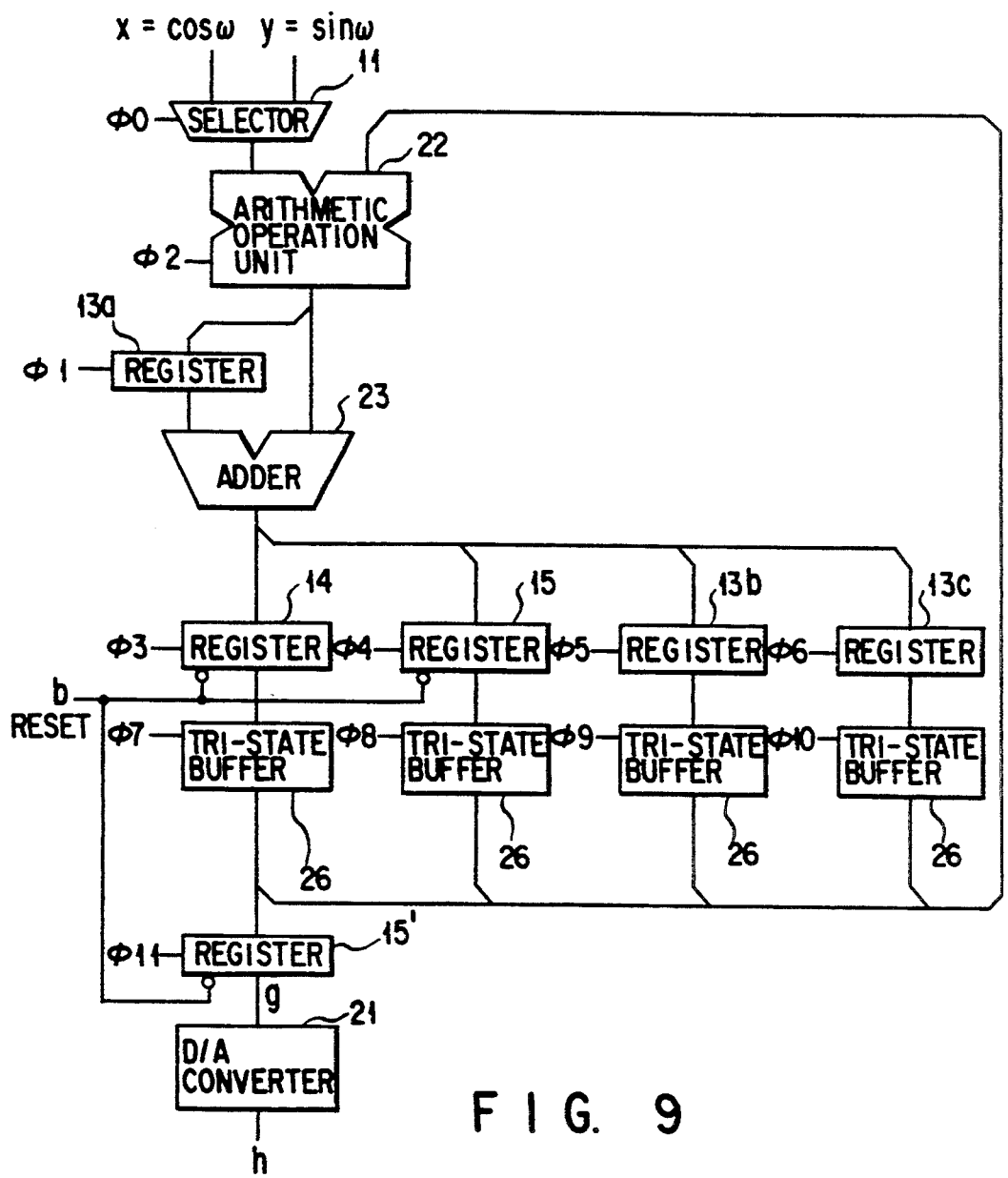
F I G. 9
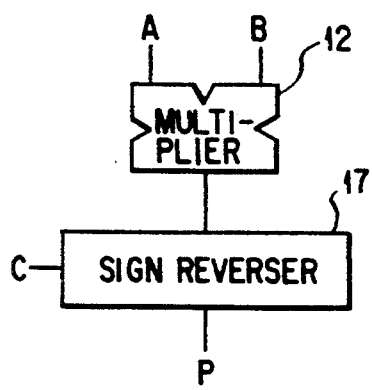
F I G. 10
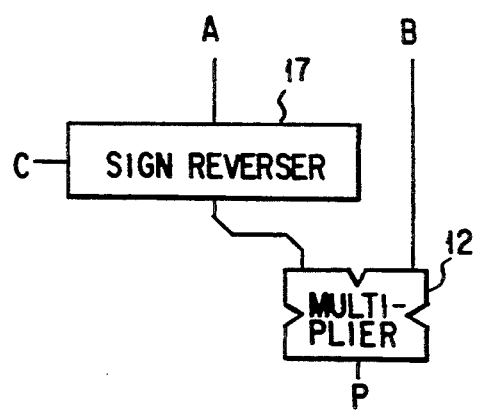
F I G. 11

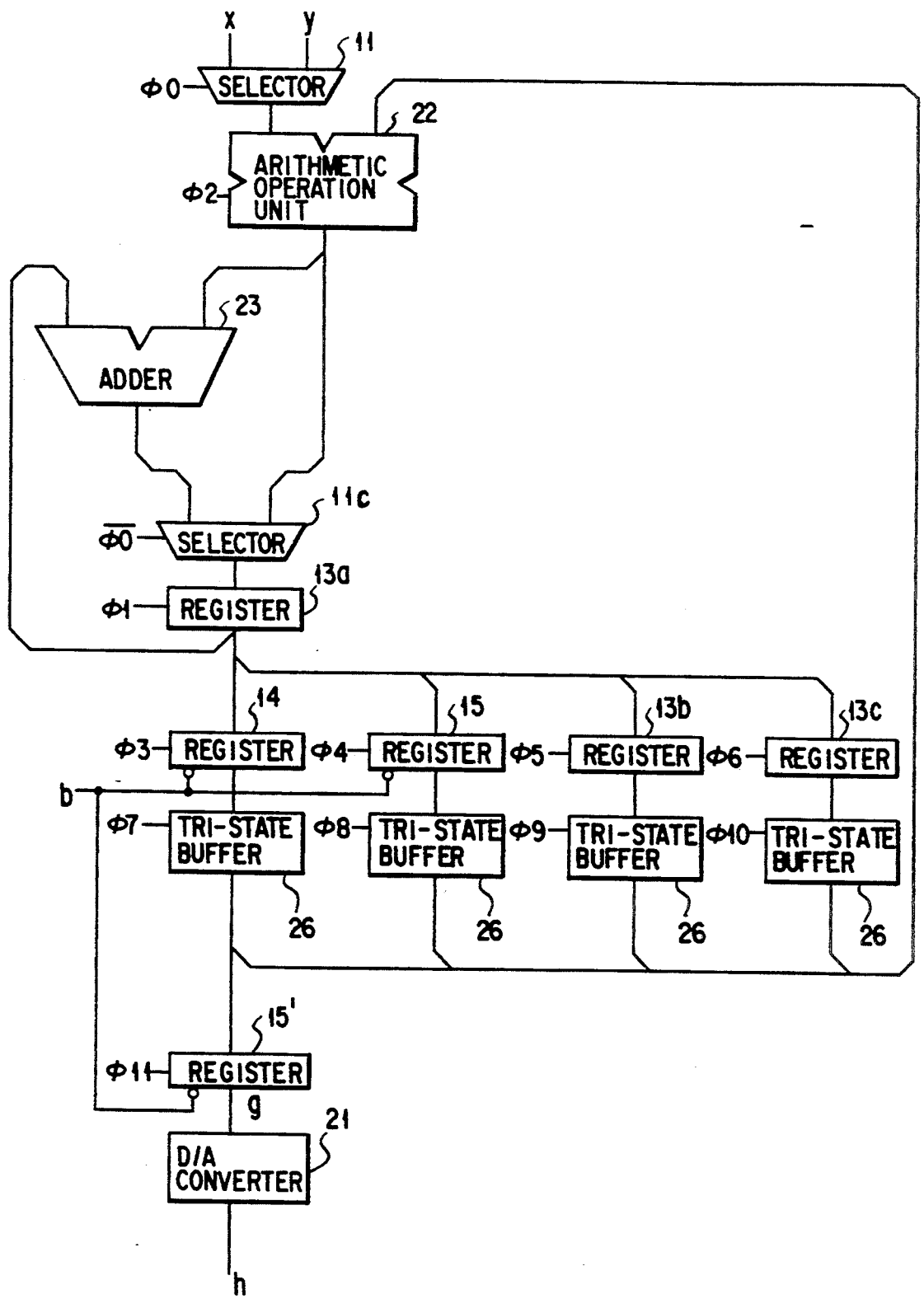
F I G. 13

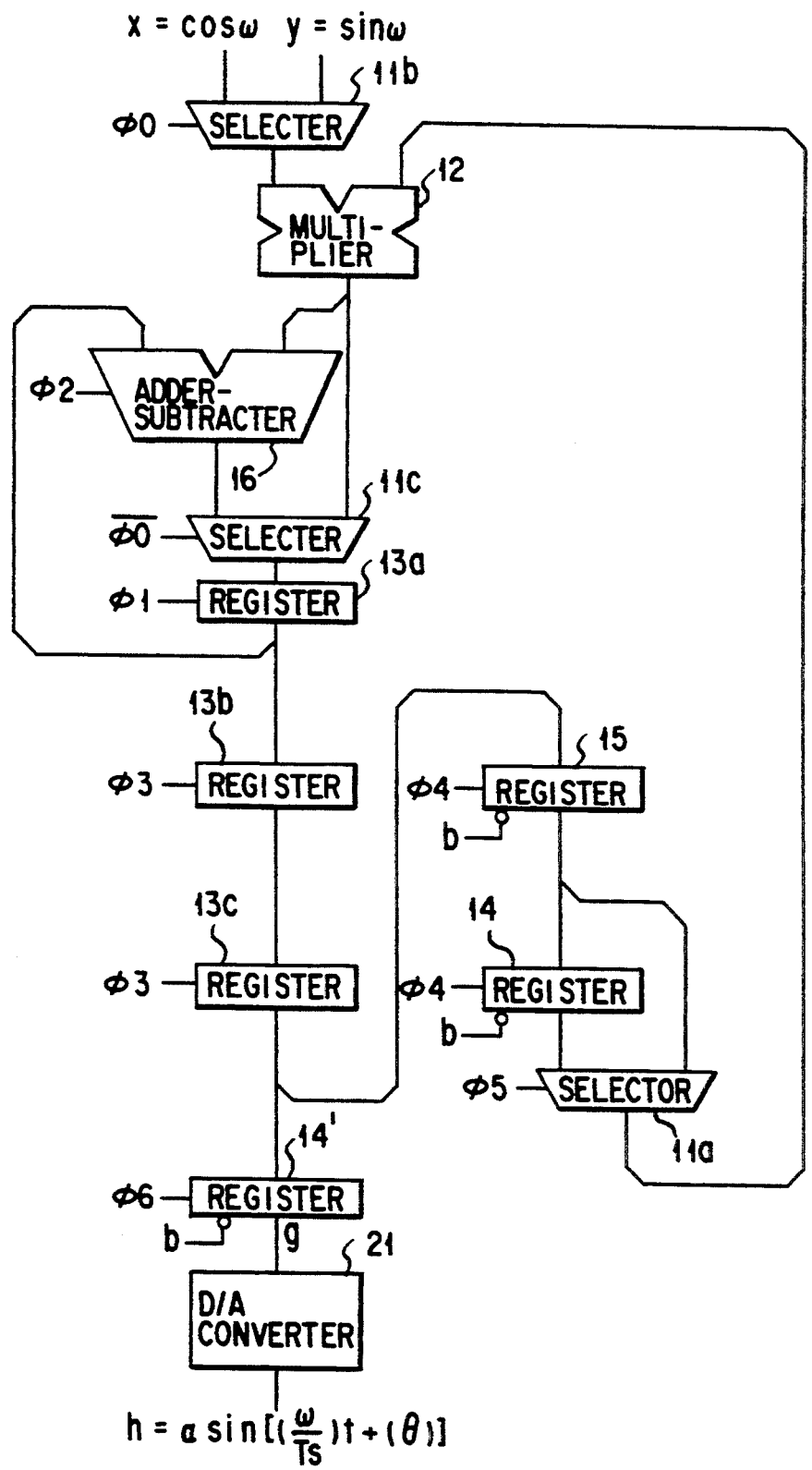
F I G. 22

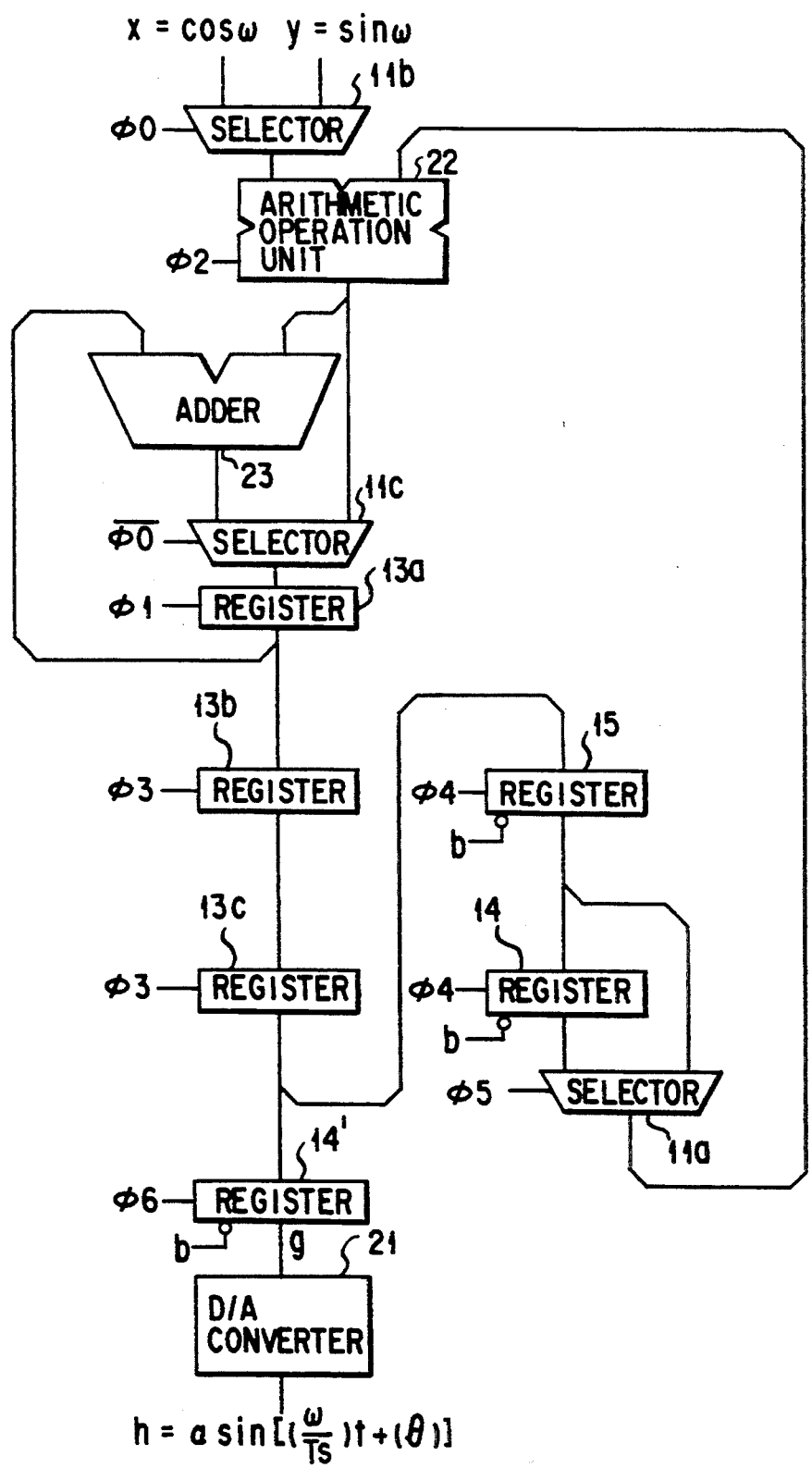
F I G. 23

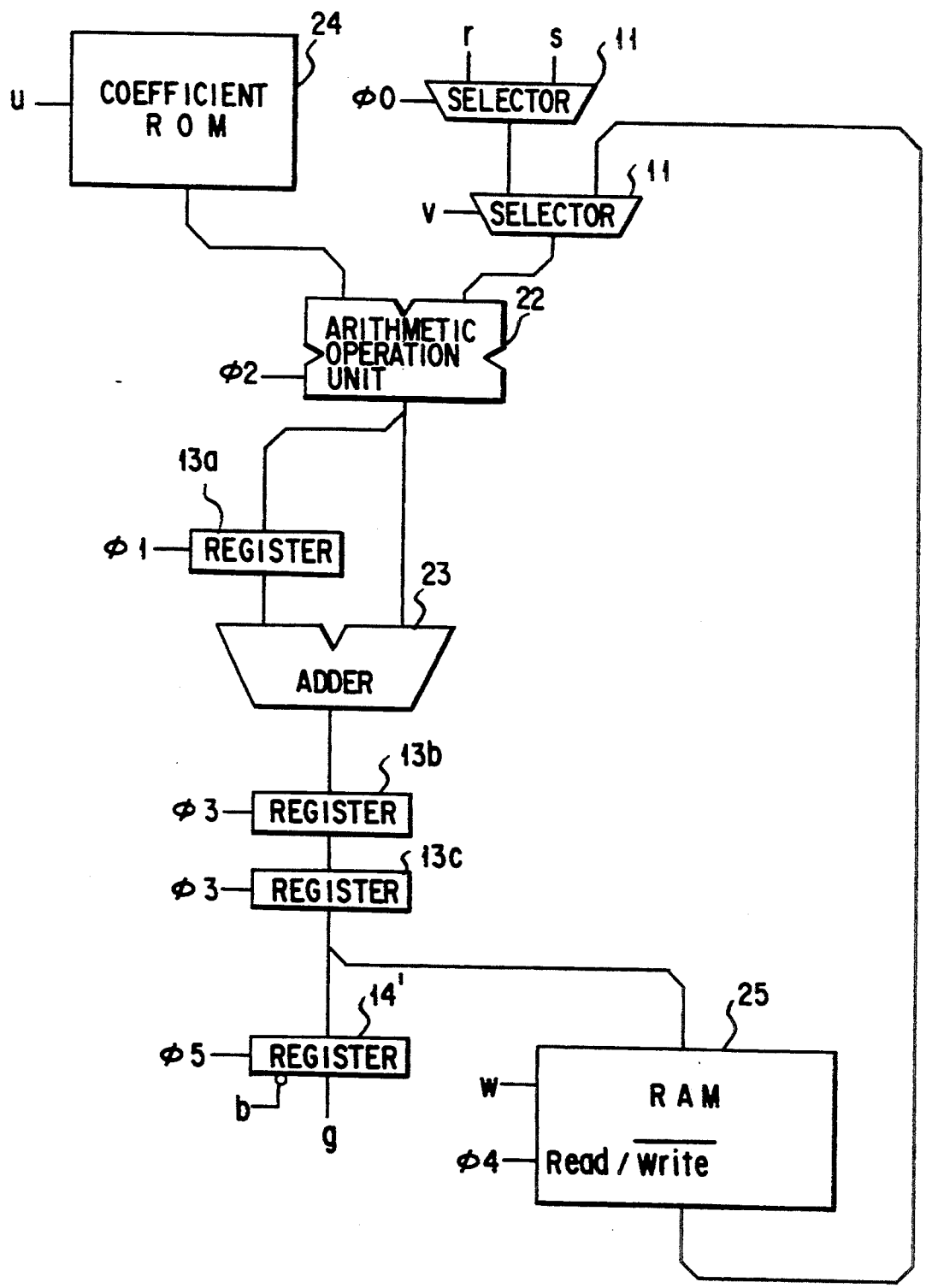
F I G. 28

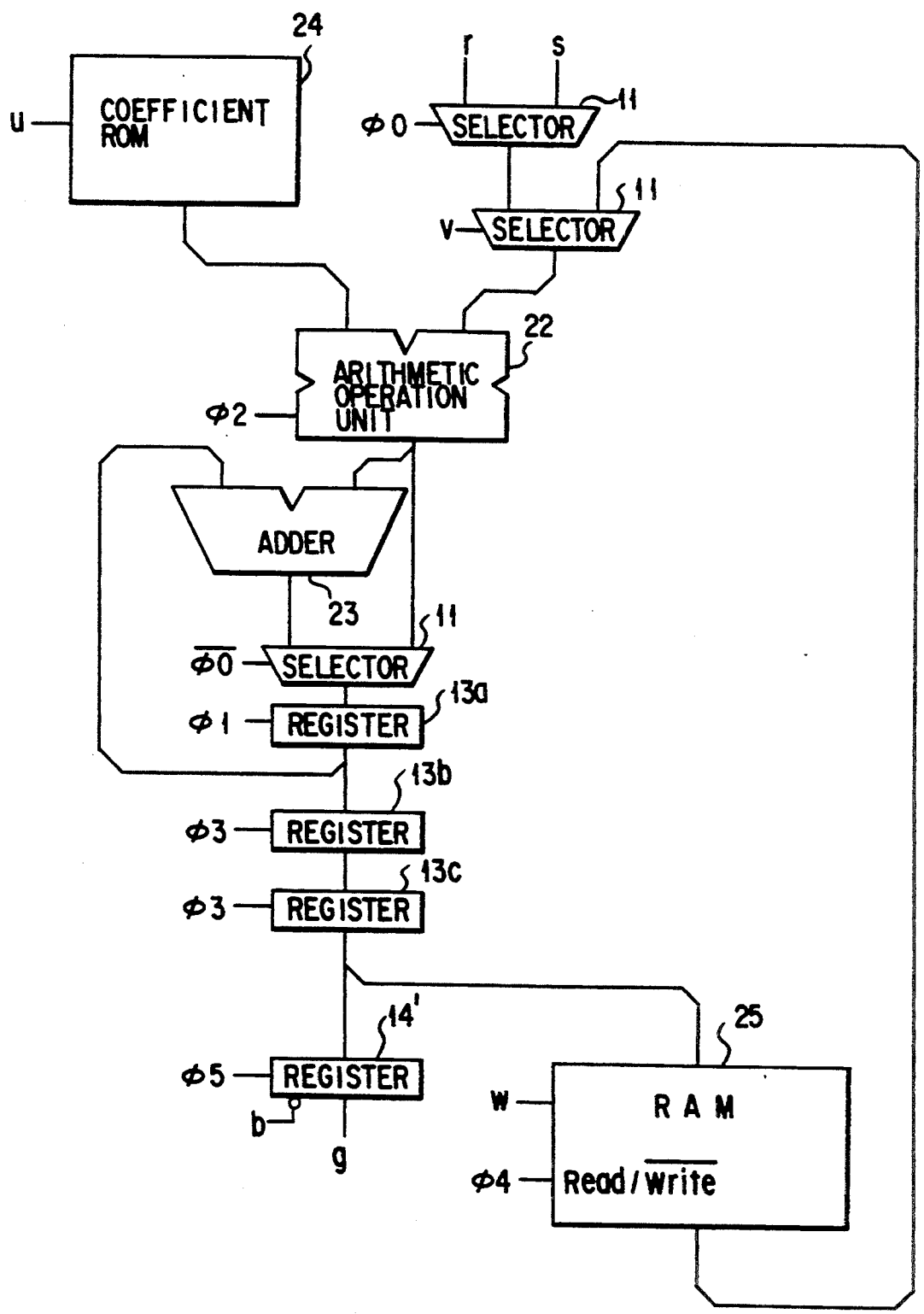
F I G. 30

DIGITAL SINE-WAVE GENERATING CIRCUIT

BACKGROUND OF THE INVENTION

1. Field of the Invention

The present invention relates to a technique of generating sinusoidal waves using digital circuits, which is specially adapted for generating telephone ring tones or for use in DTMF (Dual Tone, Multifrequency) tone dialers.

2. Description of the Related Art

A conventional digital sine-wave generating circuit is arranged as shown in FIG. 1. In the figure, 1 denotes a counter, 2 denotes a latch, 3 denotes a read-only memory (hereinafter abbreviated to ROM), and 4 denotes a digital-to-analog (D/A) converter.

The digital circuit is provided with the ROM 3 as means of generating sinusoidal waves. In the ROM 3 data samples of sinusoidal waves have been stored previously. Thus, changing the ROM address by increments of a given value to read data samples from the ROM enables a user to obtain a sinusoidal wave of a given frequency.

FIG. 3 shows a manner in which a sinusoidal wave of a given frequency is constructed from data samples read from the ROM 3. The upper portion a of the figure indicates data which has been stored in the ROM 3 previously. That is, of data obtained by sampling a sinusoidal wave, N pieces of data from $k=0$ to $k=N-1$ (one point indicates a piece of data) have been stored in the ROM previously. If the data is read regularly at intervals of n (for example, every three points), then the ROM outputs will provide such a sinusoidal wave as shown in the lower portion b of FIG. 3, which has a given frequency f represented by equation (1).

$$f = (n/N) \times fs \tag{1}$$

where fs is the sampling rate.

The counter 1 is used to read the contents of the ROM regularly at intervals of n.

FIG. 2 is a timing diagram of signals shown in FIG. 1.

First, a reset signal b is set low, so that the counter 1 is reset. Upon receipt of a latch pulse c after the reset signal b has been set high, the latch 2 outputs the initial value 0 of the counter 1, which is applied to address inputs of the ROM 3.

Next, upon receipt of a number n (for example, three) of clocks a the counter 1 advances by n. Subsequently, when another latch pulse c is applied, the ROM address e is increased by n.

Thus, repeating the application of clocks to the counter and the latch pulses to the latch allows the ROM address to be changed by increments of n. In response to the application of ROM outputs g thus read out of the ROM 3 the D/A converter 4 provides such a sinusoidal wave as described above.

In FIG. 2, Tc stands for the period of clocks input to the counter, and Ts stands for the sampling interval (Ts = 1/fs).

However, the conventional digital circuit has the following three problems.

(a) It can generate only sinusoidal waves whose frequencies are an integral multiple of fs/N [Hz].

That is, as can be seen from equation (1), the frequency of a sinusoidal wave generated is $(n/N) \times fs$ [Hz]. However, since N and fs are each a constant, the frequency is determined by the value of n ($1 \leq n < N/2$). Therefore, the frequency can only take discrete values of $n \times fs/N$.

(b) To make the frequency spacing fs/N narrower, a ROM of a larger capacity is required, which will result in an increase in the area occupied by the circuit.

That is, since the frequency of a sinusoidal signal is an integral multiple of fs/N, the precision of the frequency setting is proportional to the number N of the sampling points (the more N increases, the more the frequency spacing, fs/N, decreases). To set the frequency by increments of 1 Hz when the sampling rate fs is 8 kHz, the value of N will be 8,000 since fs/N = 1[Hz]. Thus, an 8K-word ROM will be needed.

(c) The counter needs a high-frequency clock signal.

That is, since the value of n that determines the frequency of a sinusoidal signal is set by the number of clocks to the counter, it is required that the clock period Tc and the sampling period Ts be related by $$Tc \times n \leq Ts$$

In order to generate a sinusoidal wave of, say, $f = 2[kHz]$ when $fs = 8[kHz]$ and $N = 8,000$, it is required that the clock frequency fc be $n = N \times f/fs = 2,000$ $Tc \leq Ts/n \quad fc \geq fs \times n$ $fc \geq 8[kHz] \times 2,000 = 16[MHz]$ Thus the conventional digital sine-wave generating circuit suffers from the disadvantages that the frequency of a sinusoidal signal is an integral multiple of fs/N, a large-capacity ROM is required to narrow the frequency spacing, and the counter clock signal is required to be high in frequency.

SUMMARY OF THE INVENTION

It is therefore an object of the present invention to provide a digital sine-wave generating circuit which is small in the area occupied by the circuit and high in the accuracy of frequency setting.

To attain the object, a digital sine-wave generating circuit of the present invention comprises: multiplying means for performing predetermined arithmetic operations of multiplication on the sine or cosine of a digital angular frequency ω; first storage means for storing a first output of the multiplying means; adder-subtracter means coupled to the first storage means and the multiplying means for performing arithmetic addition or subtraction of an output of the first storage means and a second output of the multiplying means; and second storage means for storing an output of the adder-subtracter means.

The predetermined arithmetic operations of multiplication by the multiplying means includes arithmetic multiplication of predetermined initial values by the sine or cosine and arithmetic multiplication of the output in the second storage means by the sine or cosine.

A digital sine-wave generating circuit of the present invention comprises: arithmetic means for performing predetermined arithmetic operations on the sine (sin ω) or cosine (cos ω) of a digital angular frequency ω, the arithmetic means being capable of reversing the sign of the result of multiplication; first storage means for storing a first output of the arithmetic means; adder means coupled to the first storage means and the arithmetic means for performing arithmetic addition of the first output in the first storage means and a second output of the arithmetic means; and second storage means for storing an output of the adder means.

The predetermined arithmetic operations in the arithmetic means includes arithmetic multiplication of predetermined initial values by the sine or cosine or inversion of the sign of the result of the multiplication, and arithmetic multiplication of the output in the second storage means by the sine or cosine or inversion of the sign of the result of the multiplication.

The second storage means comprises two pairs of storage circuits which store the predetermined initial values and the output of the adder means alternately.

The storage circuits may be connected in parallel or in series. Alternatively, the storage circuits in each pair may be connected in series with each other and the pairs may be connected in parallel with each other.

There is further provided third storage means which latches the output of the adder means and applies a series of adder means outputs to a D/A converter.

There is provided selector means which selectively outputs the first or second output of the multiplying means and the output of the adder-subtracter means, or a selector which selectively outputs the first or second output of the arithmetic means and the output of the adder means.

There is provided selector means which selects one of the four storage circuits and applies data stored in a selected storage circuit to the multiplying means or the arithmetic means.

There is further provided third storage means for storing sine and cosine values of digital angular frequencies and providing the sine (sin $\omega k$) and cosine (cos $\omega k$) of an arbitrary digital angular frequency $\omega k$ ($k=1, 2, \ldots, n$) to the multiplying means.

The second storage means includes a RAM for accumulating outputs of the adder means or the adder-subtracter means.

According to the present invention, the multiplying or arithmetic means and the adder-subtracter or adder means permit complex arithmetic operations to be performed, thereby obtaining a sine or cosine wave of an arbitrary digital angular frequency as the results of the arithmetic operations.

Therefore, a digital sine-wave generating circuit can be provided which eliminates the necessity of storing data in a ROM previously as in the conventional circuit, decreases the occupied area by the circuit, and increases the precision in frequency setting.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 5 shows, in block form, a digital sine-wave generating circuit according to a first embodiment of the present invention;

FIG. 9 is a block diagram of a digital sine-wave generating circuit according to a second embodiment of the present invention;

FIGS. 10 and 11 show examples of the arithmetic unit of FIG. 9;

FIG. 13 is a block diagram of a digital sine-wave generating circuit according to a fourth embodiment of the present invention;

FIG. 22 is a block diagram of a digital sine-wave generating circuit according to an eleventh embodiment of the present invention;

FIG. 23 is a block diagram of a digital sine-wave generating circuit according to a twelfth embodiment of the present invention;

FIG. 28 is a block diagram of a digital sine-wave generating circuit according to a fifteenth embodiment of the present invention;

FIG. 30 is a block diagram of a digital sine-wave generating circuit according to a seventeenth embodiment of the present invention;

DETAILED DESCRIPTION OF THE PREFERRED EMBODIMENTS

Sine-wave generating circuits of the present invention are arranged to generate a sinusoidal wave of any frequency not by storing a sinusoidal wave in a ROM but by executing the complex multiplication given by $$\begin{aligned} g(m) &= \alpha e^{j\omega m} = \alpha \prod_{k=0}^{m} e^{j\omega} \\ &= \alpha \prod_{k=0}^{m} (\cos\omega + j\sin\omega) \end{aligned}$$

where $\omega$ (digital angular frequency) $= 2\pi f/fs$, and m is a positive integer.

Figure 1:
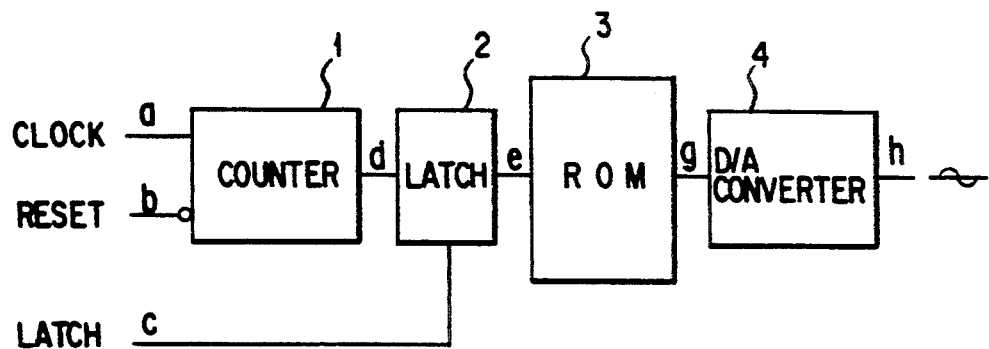
FIG. 1 is a block diagram of a conventional digital sine-wave generating circuit.
Figure 2:
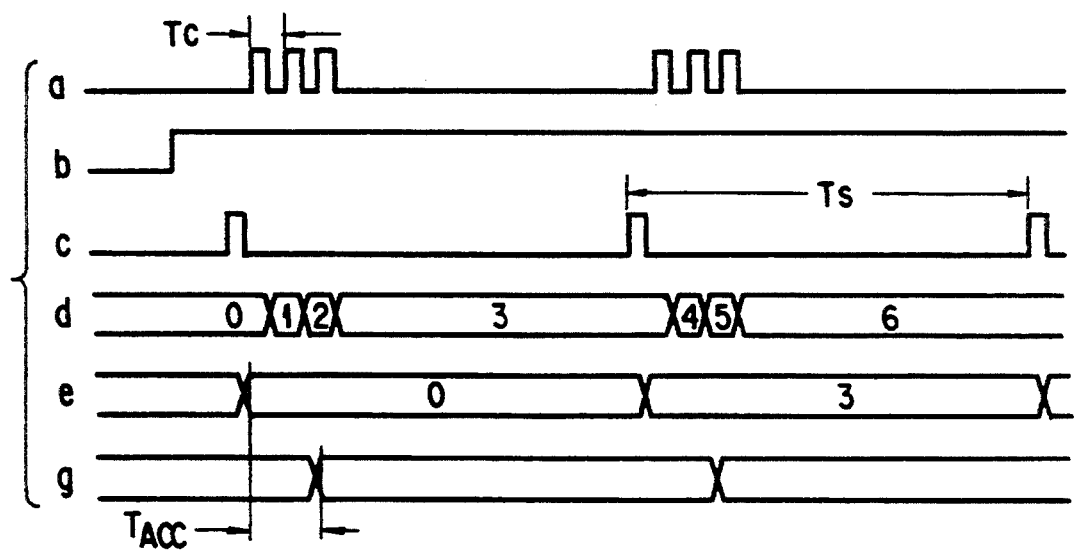
FIG. 2 is a timing diagram of signals a to g shown in FIG. 1.
Figure 3:
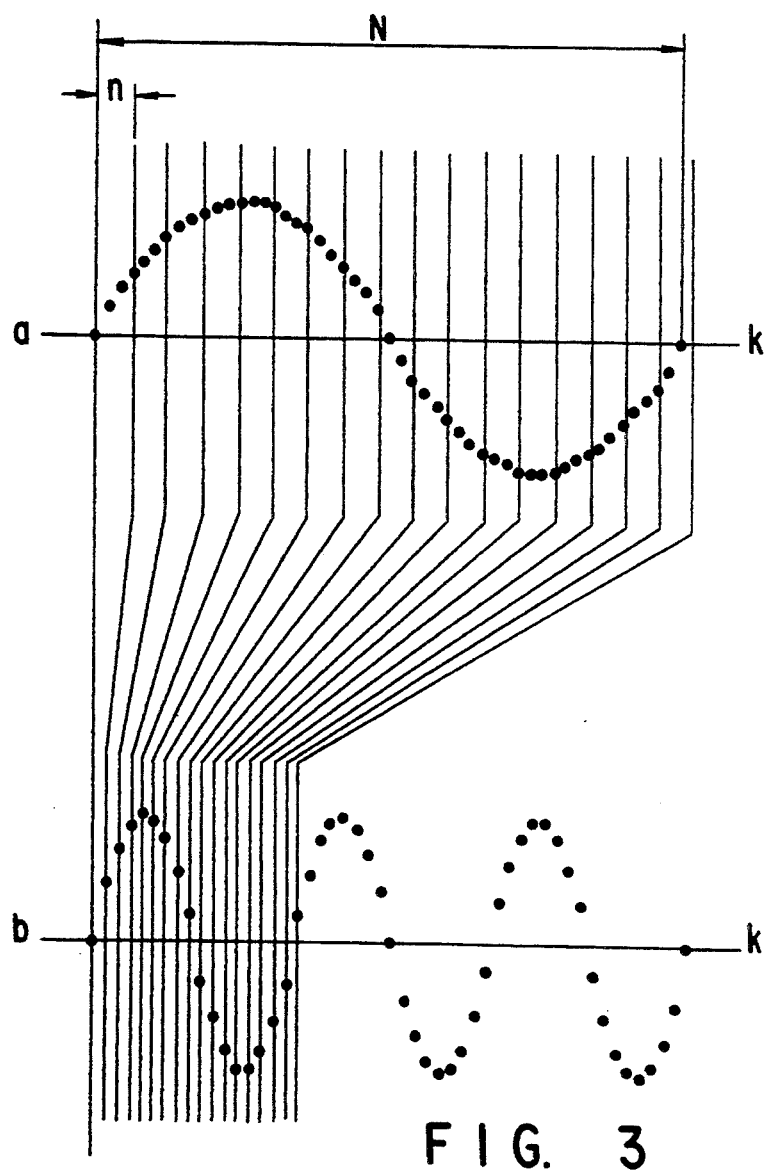
FIG. 3 illustrates the principle of generation of a sinusoidal wave in the circuit of FIG. 1.
Figure 4:
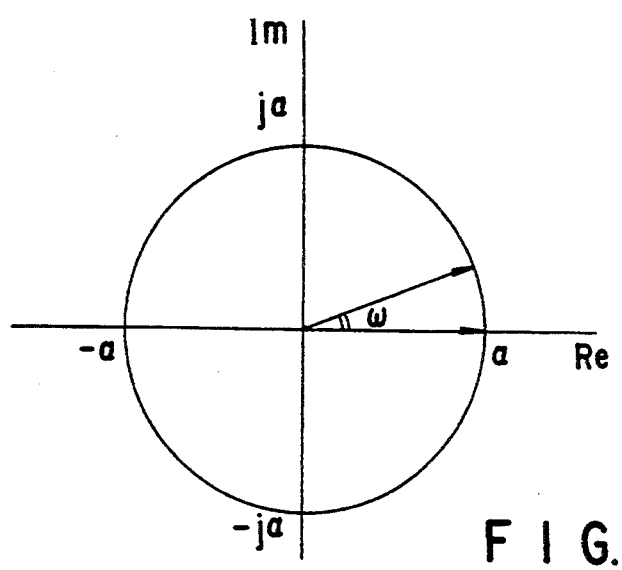
FIG. 4 illustrates the principle of generation of a sinusoidal wave according to the present invention.

This operation corresponds to the rotation of a vector on a complex plane shown in FIG. 4 with center at the origin.

When the initial value of a vector $$\begin{pmatrix} \alpha \\ 0 \end{pmatrix}$$

is multiplied from the left-hand side by a matrix operator representing rotation $$\begin{pmatrix} \cos\omega & j\sin\omega \\ j\sin\omega & \cos\omega \end{pmatrix}$$

a vector rotated through the angle $\omega$ is obtained which is represented by $$\begin{pmatrix} \alpha\cos\omega \\ j\alpha\sin\omega \end{pmatrix}$$

When the vector's initial value is multiplied by the matrix operator representing rotation from the left-hand side a number of times (m), the vector rotates counterclockwise in $\omega$ increments. The real part of the rotating vector is $\alpha\cos(m\omega)$, and the imaginary part is $\alpha\sin(m\omega)$, so that a sinusoidal wave is obtained.

FIG. 5 is a block diagram of a digital sine-wave generating circuit according to a first embodiment of the present invention. In this figure, 11 denotes a selector, 12 denotes a multiplier, 13a to 13c, 14, 15, and 15′ denote registers, 16 denotes an adder-subtracter, 21 denotes a D/A converter, and 26 denotes a tri-state buffer.

Figure 6:
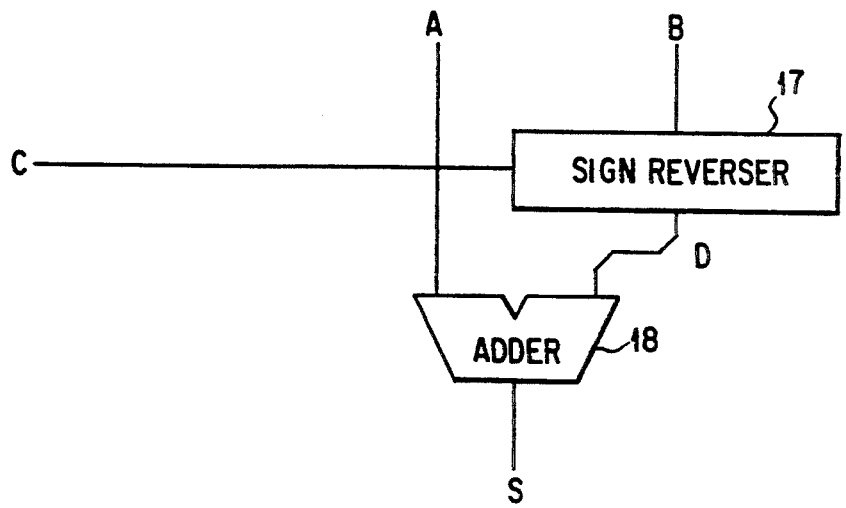
FIG. 6 shows an example of the adder-subtracter of FIG. 5.
Figure 7:
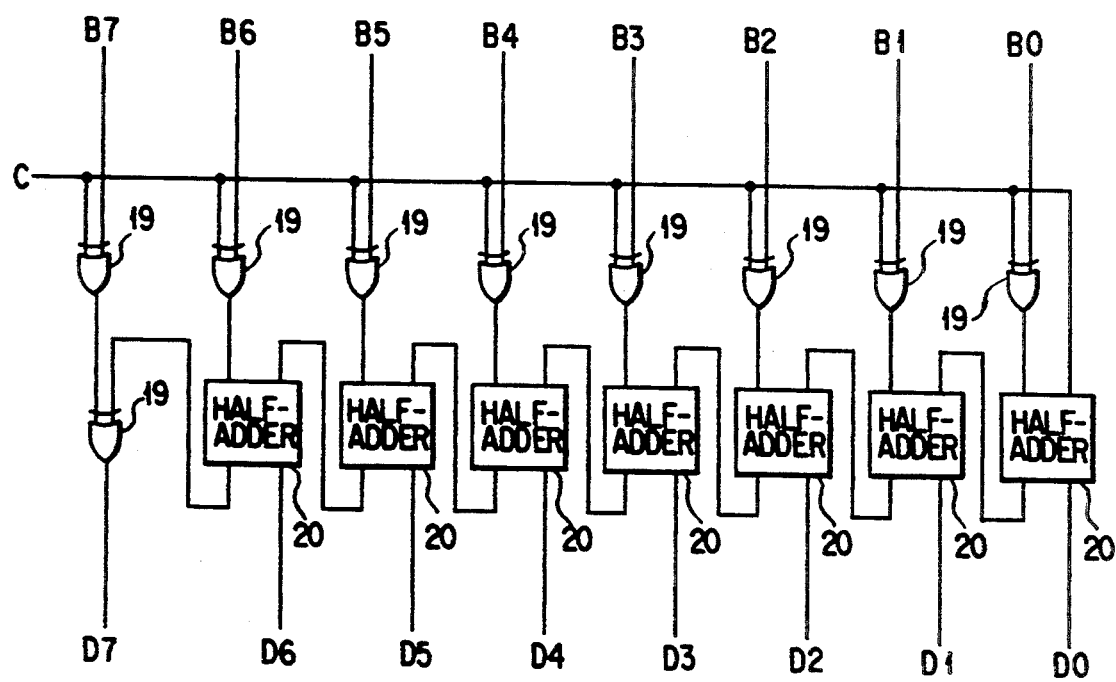
FIG. 7 shows an example of the sign reverser of FIG. 6.

FIG. 6 shows an example of the adder-subtracter 16 of FIG. 5. In this figure, 17 denotes a sign reverser, and 18 denotes an adder. FIG. 7 shows an example of the sign reverser of FIG. 6. In this figure, 19 denotes EXCLUSIVE-OR gates, and 20 denotes half-adders.

Figure 8:
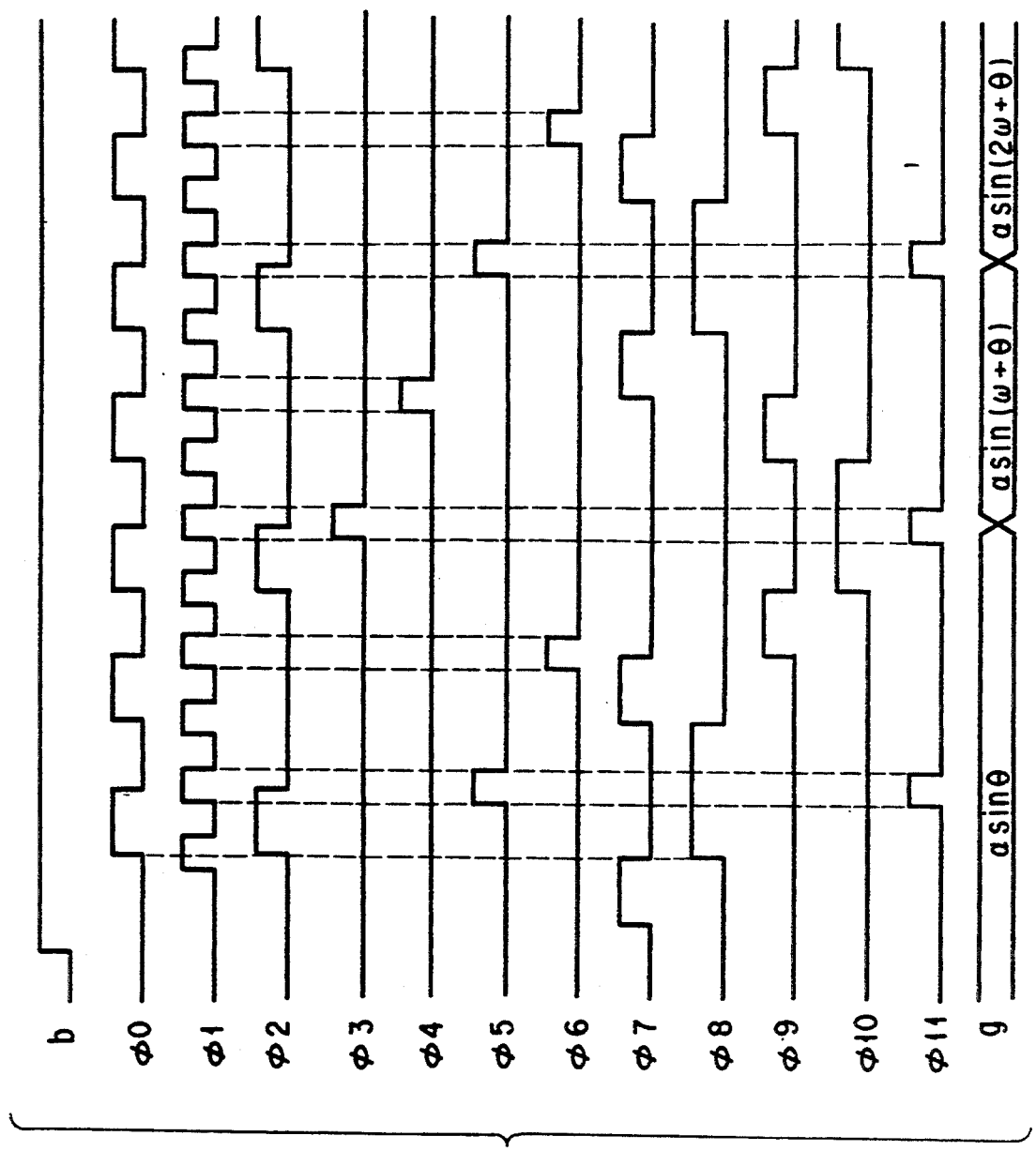
FIG. 8 is a timing diagram useful in understanding the operation of the circuit of FIG. 5.

FIG. 8 is a timing diagram of the digital sine-wave generating circuit of FIG. 5.

The operation of the circuit will be described hereinafter.

[The first arithmetic operation]

First, a reset signal b is applied to the registers 14 and 15, so that they are set to their respective initial values $\alpha\cos\theta$ and $\alpha\sin\theta$.

Next, $\alpha\cos\theta$ and $\cos\omega$ are respectively applied from the register 14 and the selector 11 to the multiplier 12 where $\alpha\cos\theta\times\cos\omega$ is calculated. The product is then stored in the register 13a. Next, the multiplier 12 is supplied with $\alpha\sin\theta$ and $\sin\omega$ from the register 15 and the selector 11, respectively. The multiplier 12 calculates $\alpha\sin\theta\times\sin\omega$.

Subsequently, $\alpha\sin\theta\times\sin\omega$ is subtracted from the data $\alpha\cos\theta\times\cos\omega$ stored in the register 13a by the adder-subtracter 16, obtaining $\alpha\cos(\omega+\theta)$. The result is then stored in the register 13b.

Next, $\alpha\sin\theta$ and $\cos\omega$ are respectively applied from the register 15 and the selector 11 to the multiplier 12 where $\alpha\sin\theta\times\cos\omega$ is calculated. The product is then stored in the register 13a. Next, the multiplier 12 is supplied with $\alpha\cos\theta$ and $\sin\omega$ from the register 14 and the selector 11, respectively. The multiplier 12 calculates the product $\alpha\cos\theta\times\sin\omega$.

Subsequently, $\alpha\cos\theta\times\sin\omega$ is added to the data $\alpha\sin\theta\times\cos\omega$ stored in the register 13a by the adder-subtracter 16, obtaining $\alpha\sin(\omega+\theta)$. The result is then stored in the register 13c.

[The second arithmetic operation]

First, $\alpha\cos(\omega+\theta)$ and $\cos\omega$ are respectively applied from the register 13b and the selector 11 to the multiplier 12 where $\alpha\cos(\omega+\theta)\times\cos\omega$ is calculated. The product is then stored in the register 13a. Next, the multiplier 12 is supplied with $\alpha\sin(\omega+\theta)$ and $\sin\omega$ from the register 13c and the selector 11, respectively. The multiplier 12 calculates $\alpha\sin(\omega+\theta)\times\sin\omega$.

Subsequently, the product, $\alpha\sin(\omega+\theta)\times\sin\omega$, is subtracted from the data, $\alpha\cos(\omega+\theta)\times\cos\omega$, stored in the register 13a by the adder-subtracter 16, obtaining $\alpha\cos(2\omega+\theta)$. The result is then stored in the register 14.

Next, $\alpha\sin(\omega+\theta)$ and $\cos\omega$ are respectively applied from the register 13c and the selector 11 to the multiplier 12 where $\alpha\sin(\omega+\theta)\times\cos\theta$ is calculated. The product is then stored in the register 13a. Next, the multiplier 12 is supplied with $\alpha\cos(\omega+\theta)$ and $\sin\omega$ from the register 13b and the selector 11, respectively. The multiplier 12 calculates $\alpha\cos(\omega+\theta)\times\sin\omega$.

Subsequently, the product, $\alpha\cos(\omega+\theta)\times\sin\omega$, is added to the data, $\alpha\sin(\omega+\theta)\times\cos\omega$, stored in the register 13a by the adder-subtracter 16, so that $\alpha\sin(2\omega+\theta)$ is obtained. The result is then stored in the register 15.

When the above arithmetic operations are performed m times, $\alpha\cos(m\omega+\theta)$ and $\alpha\sin(m\omega+\theta)$ are obtained. When m is an odd number, $\alpha\cos(m\omega+\theta)$ and $\alpha\sin(m\omega+\theta)$ are stored in the registers 13b and 13c, respectively. when m is an even number, on the other hand, $\alpha\cos(m\omega+\theta)$ and $\alpha\sin(m\omega+\theta)$ are stored in the registers 14 and 15, respectively. Thus, if the inputs to the multiplier 12 are latched in a timely manner, then $\alpha\cos(m\omega+\theta)$ or $\alpha\sin(m\omega+\theta)$ will be entered in turn into the D/A converter 21.

When the inputs of the multiplier 12 are latched at the times (φ11) indicated in FIG. 8, the D/A converter 21 provides an analog sinusoidal wave represented by $$h = \alpha \sin[(\omega/T_s)t + \theta]$$

FIG. 9 is a block diagram of a digital sine-wave generating circuit according to a second embodiment of the present invention. In FIG. 9, 22 denotes an arithmetic operation unit which multiplies two inputs and then outputs the product as it is or with its sign reversed, and 23 denotes an adder. In FIG. 9, like reference numerals are used to denote corresponding parts to those shown in FIG. 5.

FIG. 10 shows an example of the arithmetic unit 22 shown in FIG. 9. In the figure, 12 denotes a multiplier and 17 denotes a sign reverser. FIG. 11 shows another example of the arithmetic unit 22.

When operated at the times shown in FIG. 8, the digital sine-wave generating circuit of FIG. 9 can also generate a sinusoidal wave. That is, the digital sine-wave generating circuits of FIGS. 5 and 9 are essentially the same in operation.

However, the circuit of FIG. 9 differs from the circuit of FIG. 5 in that no arithmetic operation of subtracting the result of multiplication from data stored in the register 13a is performed. That is, in the circuit of FIG. 9, such arithmetic operation is replaced by an arithmetic operation of adding the result of multiplication output, with the sign reversed, from the arithmetic unit 22 to data stored in the register 13a.

For example, in the first operation, $\alpha\cos\theta$ from the register 14 and $\cos\omega$ from the selector 11 are multiplied by the arithmetic unit 22 and the result, $\alpha\cos\theta \times \cos\omega$, is then stored in the register 13a. Next, in the arithmetic unit 22, $\alpha\sin\theta$ from the register 15 and $\sin\omega$ from the selector 11 are multiplied and the sign of the product is reversed, so that $-\alpha\sin\theta \times \sin\omega$ is output. Subsequently, $\alpha\cos\theta \times \cos\omega$ from the register 13a and $-\alpha\sin\theta \times \sin\omega$ from the arithmetic unit 22 are added together in the adder 23, thereby obtaining $\alpha\cos(\omega+\theta)$.

In the second embodiment as well, by latching the inputs to the arithmetic unit 22 at appropriate times, a series of $\alpha\cos(m\omega+\theta)$ or $\alpha\sin(m\omega+\theta)$ (m=1, 2, 3 ...) can be entered into the D/A converter 21. Thus, the latching of the inputs to the arithmetic unit 22 at the times (φ11) shown in FIG. 8 permits the D/A converter 21 to produce an analog sinusoidal wave represented by $$h = \alpha\sin[(\omega/T_s)t + \theta]$$

Figure 12:
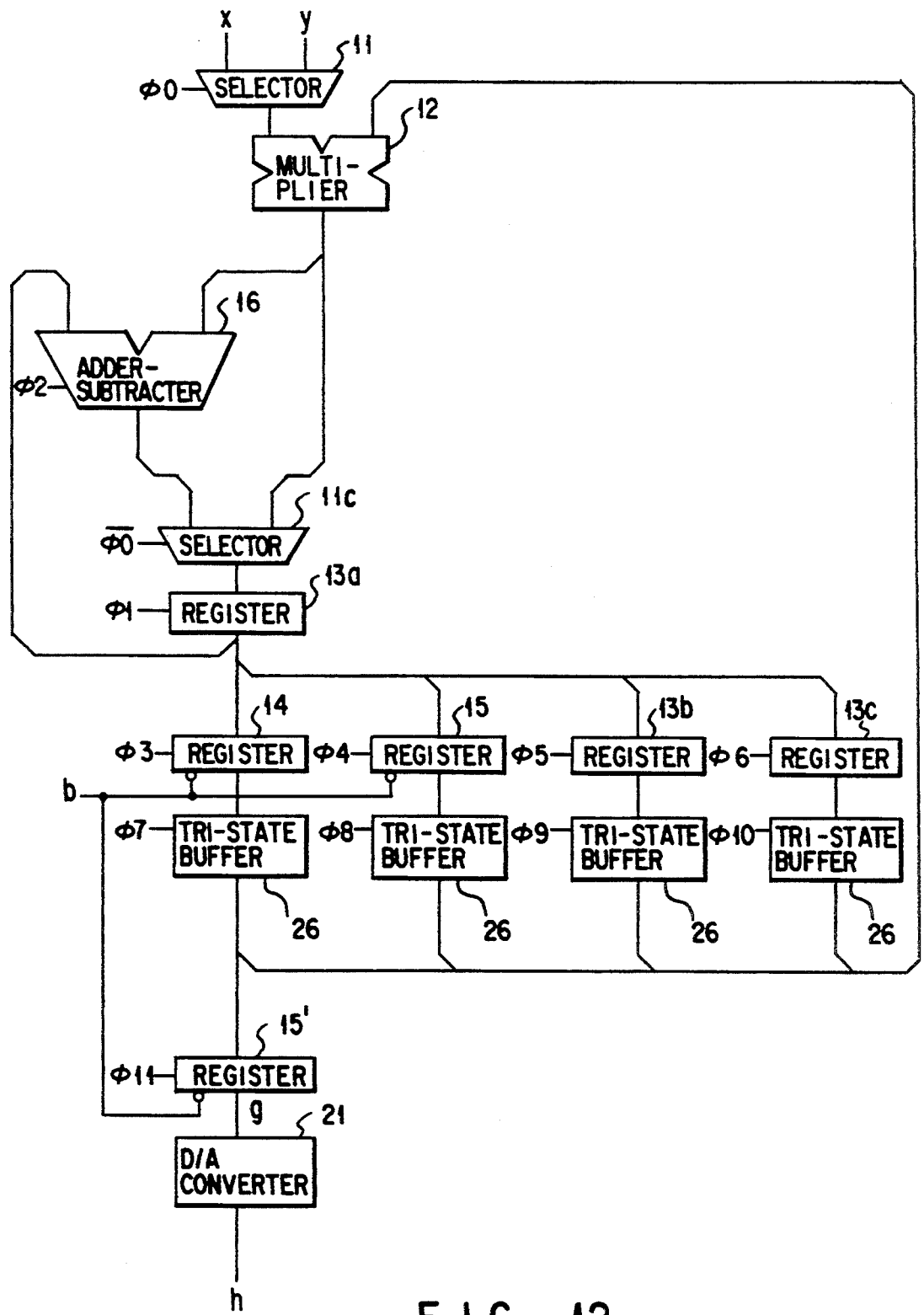
FIG. 12 is a block diagram of a digital sine-wave generating circuit according to a third embodiment of the present invention.

FIG. 12 shows a digital sine-wave generating circuit according to a third embodiment of the present invention. In FIG. 12, like reference numerals are used to denote corresponding parts to those in FIG. 5.

The digital sine-wave generating circuit of FIG. 12 also operates at the times shown in FIG. 8 to generate a sinusoidal wave. The operation of this circuit will be described hereinafter.

[The first arithmetic operation]

First, a reset signal b is applied to the registers 14 and 15, so that they are set to their respective initial values $\alpha\cos\theta$ and $\alpha\sin\theta$.

Next, $\alpha\cos\theta$ and $\cos\omega$ are respectively applied from the register 14 and the selector 11 to the multiplier 12 where $\alpha\cos\theta \times \cos\omega$ is calculated. The product is then stored in the register 13a. Next, the multiplier 12 is supplied with $\alpha\sin\theta$ and $\sin\omega$ from the register 15 and the selector 11, respectively. The multiplier 12 calculates the product $\alpha\sin\theta \times \sin\omega$.

Subsequently, the product, $\alpha\sin\theta \times \sin\omega$, is subtracted from the data, $\alpha\cos\theta \times \cos\omega$, stored in the register 13a by the adder-subtracter 16, obtaining $\alpha\cos(\omega+\theta)$. The result is then stored in the register 13b.

Next, $\alpha\sin\theta$ and $\cos\omega$ are respectively applied from the register 15 and the selector 11 to the multiplier 12 where $\alpha\sin\theta \times \cos\omega$ is calculated. The product is then stored in the register 13a. Next, the multiplier 12 is supplied with $\alpha\cos\theta$ and $\sin\omega$ from the register 14 and the selector 11, respectively. The multiplier 12 calculates $\alpha\cos\theta \times \sin\omega$.

Subsequently, the product, $\alpha\cos\theta \times \sin\omega$, is added to the data, $\alpha\sin\theta \times \cos\omega$, stored in the register 13a by the adder-subtracter 16, obtaining $\alpha\sin(\omega+\theta)$. The result is then stored in the register 13c.

[The second arithmetic operation]

First, $\alpha\cos(\omega+\theta)$ and $\cos\omega$ are respectively applied from the register 13b and the selector 11 to the multiplier 12 where $\alpha\cos(\omega+\theta) \times \cos\omega$ is calculated. The product is then stored in the register 13a. Next, the multiplier 12 is supplied with $\alpha\sin(\omega+\theta)$ and $\sin\omega$ from the register 13c and the selector 11, respectively. The multiplier 12 calculates $\alpha\sin(\omega+\theta) \times \sin\omega$.

Subsequently, the product, $\alpha\sin(\omega+\theta) \times \sin\omega$, is subtracted from the data, $\alpha\cos(\omega+\theta) \times \cos\omega$, stored in the register 13a by the adder-subtracter 16, obtaining $\alpha\cos(2\omega+\theta)$. The result is then stored in the register 14.

Next, $\alpha\sin(\omega+\theta)$ and $\cos\omega$ are respectively applied from the register 13c and the selector 11 to the multiplier 12 where $\alpha\sin(\omega+\theta) \times \cos\omega$ is calculated. The product is then stored in the register 13a. Next, the multiplier 12 is supplied with $\alpha\cos(\omega+\theta)$ and $\sin\omega$ from the register 13b and the selector 11, respectively. The multiplier 12 calculates $\alpha\cos(\omega+\theta) \times \sin\omega$.

Subsequently, the product, $\alpha\cos(\omega+\theta) \times \sin\omega$, is added to the data, $\alpha\sin(\omega+\theta) \times \cos\omega$, stored in the register 13a by the adder-subtracter 16, so that $\alpha\sin(2\omega+\theta)$ is obtained. The result is then stored in the register 15.

When the above arithmetic operations are repeated m times, $\alpha\cos(m\omega+\theta)$ and $\alpha\sin(m\omega+\theta)$ are obtained. When m is an odd number, $\alpha\cos(m\omega+\theta)$ and $\alpha\sin(m\omega+\theta)$ are stored in the registers 13b and 13c, respectively. When m is an even number, on the other hand, $\alpha\cos(m\omega+\theta)$ and $\alpha\sin(m\omega+\theta)$ are stored in the registers 14 and 15, respectively. Thus, if the inputs to the multiplier 12 are latched in a timely manner, then a series of $\alpha\cos(m\omega+\theta)$ or $\alpha\sin(m\omega+\theta)$ will be entered into the D/A converter 21.

When the inputs of the multiplier 12 are latched at the times (φ11) indicated in FIG. 8, the D/A converter 21 provides an analog sinusoidal wave represented by $$h = \alpha\sin[(\omega/T_s)t + \theta]$$

FIG. 13 is a block diagram of a digital sine-wave generating circuit according to a fourth embodiment of the present invention. In FIG. 13, like reference numerals are used to denote corresponding parts to those shown in FIG. 9.

When operated at the times shown in FIG. 8, the digital sine-wave generating circuit of FIG. 13 can also generate a sinusoidal wave. However, in the circuit of FIG. 13, as in the circuit of FIG. 9, no arithmetic operation of subtracting the result of multiplication from data stored in the register 13a is performed. That is, in the circuit of FIG. 13, such arithmetic operation is replaced by arithmetic operation of adding the result of multiplication output, with the sign reversed, from the arithmetic unit 22 to data stored in the register 13a.

For example, in the first operation, $\alpha\cos\theta$ from the register 14 and $\cos\omega$ from the selector 11 are multiplied by the arithmetic unit 22 and the result, $\alpha\cos\theta\times\cos\omega$, is then stored in the register 13a. Next, in the arithmetic unit 22, $\alpha\sin\theta$ from the register 15 and $\sin\omega$ from the selector 11 are multiplied and the sign of the product is reversed, so that $-\alpha\sin\theta\times\sin\omega$ is output. Subsequently, $\alpha\cos\theta\times\cos\omega$ from the register 13a and $-\alpha\sin\theta\times\sin\omega$ from the arithmetic unit 22 are added together in the adder 23, thereby obtaining $\alpha\cos(\omega+\theta)$.

In the present embodiment as well, by latching the inputs to the arithmetic unit 22 at appropriate times, a series of $\alpha\cos(m\omega+\theta)$ or $\alpha\sin(m\omega+\theta)$ (m=1, 2, 3 . . . ) can be entered into the D/A converter 21. Thus, the latching of the inputs to the arithmetic unit 22 at the times ($\phi$11) shown in FIG. 8 permits the D/A converter 21 to produce an analog sinusoidal wave represented by $$h=\alpha\sin[(\omega/Ts)t+\theta]$$

Figure 14:
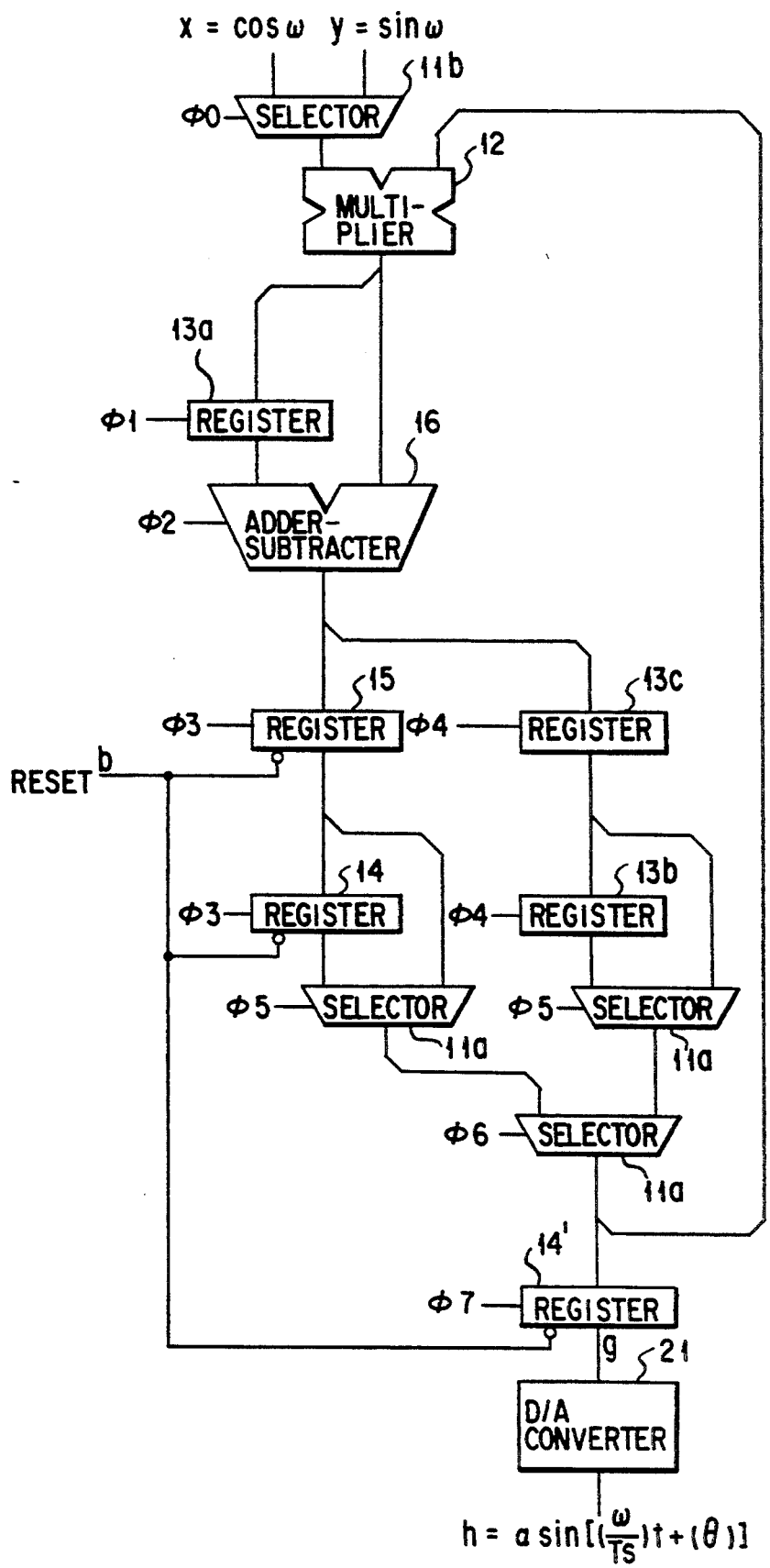
FIG. 14 is a block diagram of a digital sine-wave generating circuit according to a fifth embodiment of the present invention.

FIG. 14 shows a digital sine-wave generating circuit according to a fifth embodiment of the present invention. In FIG. 14, like reference numerals are used to denote corresponding parts to those in FIG. 5.

Figure 15:
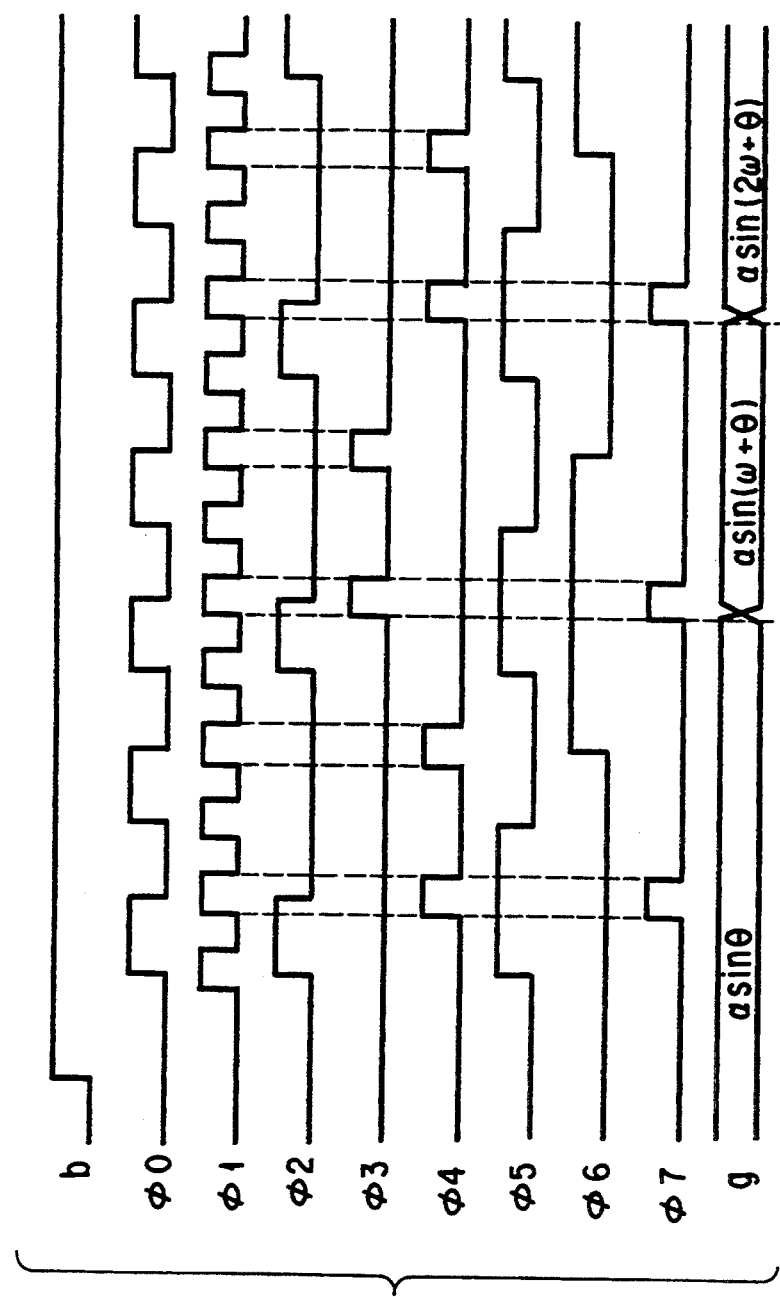
FIG. 15 is a timing diagram useful in understanding the operation of the circuit of FIG. 14.

FIG. 15 is a timing diagram of the circuit of FIG. 14. The operation of this circuit will be described hereinafter.

[The first arithmetic operation]

First, a reset signal b is applied to the registers 14 and 15, so that they are set to their respective initial values $\alpha\cos\theta$ and $\alpha\sin\theta$.

Next, the multiplier is supplied with $\alpha\cos\theta$ from the register 14 via selectors 11a and with $\cos\omega$ from the selector 11b, so that $\alpha\cos\theta\times\cos\omega$ is calculated. The product is then stored in the register 13a. Next, the multiplier 12 is supplied with $\alpha\sin\theta$ from the register 15 via selectors 11a and with $\sin\omega$ from the selector 11b. The multiplier 12 then calculates $\alpha\sin\theta\times\sin\omega$.

Subsequently, $\alpha\sin\theta\times\sin\omega$ is subtracted from the data, $\alpha\cos\theta\times\cos\omega$, stored in the register 13a by the adder-subtracter 16, obtaining $\alpha\cos(\omega+\theta)$. The result is then stored in the register 13c.

Next, the multiplier 12 is supplied with $\alpha\sin\theta$ from the register 15 via the selectors 11a and $\cos\omega$ from the selector 11b, so that $\alpha\sin\theta\times\cos\omega$ is calculated. The product is then stored in the register 13a. Next, the multiplier 12 is supplied with $\alpha\cos\theta$ from the register 14 via the selectors 11a and $\sin\omega$ from the selector 11b, so that $\alpha\cos\theta\times\sin\omega$ is calculated.

Subsequently, the product, $\alpha\cos\theta\times\sin\omega$, is added to the data, $\alpha\sin\theta\times\cos\omega$, stored in the register 13a by the adder-subtracter 16, obtaining $\alpha\sin(\omega+\theta)$. The result, $\alpha\sin(\omega+\theta)$, is then stored in the register 13c after $\alpha\cos(\omega+\theta)$ has been moved from the register 13c to the register 13b.

[The second arithmetic operation]

First, the multiplier 12 is supplied with $\alpha\cos(\omega+\theta)$ from the register 13b via the selectors 11a and $\cos\omega$ from the selector 11b whereby $\alpha\cos(\omega+\theta)\times\cos\omega$ is calculated. The product is then stored in the register 13a. Next, the multiplier 12 is supplied with $\alpha\sin(\omega+\theta)$ from the register 13c via the selectors 11a and $\sin\omega$ from the selector 11b, so that $\alpha\sin(\omega+\theta)\times\sin\omega$ is calculated.

Subsequently, the product, $\alpha\sin(\omega+\theta)\times\sin\omega$, is subtracted from the data, $\alpha\cos(\omega+\theta)\times\cos\omega$, stored in the register 13a by the adder-subtracter 16, obtaining $\alpha\cos(2\omega+\theta)$. The result is then stored in the register 15.

Next, the multiplier 12 is supplied with $\alpha\sin(\omega+\theta)$ from the register 13c via the selectors 11a and $\cos\omega$ from the selector 11b, thereby calculating $\alpha\sin(\omega+\theta)\times\cos\omega$. The product is then stored in the register 13a. Next, the multiplier 12 is supplied with $\alpha\cos(\omega+\theta)$ from the register 13b via the selectors 11a and $\sin\omega$ from the selector 11b. The multiplier 12 calculates $\alpha\cos(\omega+\theta)\times\sin\omega$.

Subsequently, the product, $\alpha\cos(\omega+\theta)\times\sin\omega$, is added to the data, $\alpha\sin(\omega+\theta)\times\cos\omega$, stored in the register 13a in the adder-subtracter 16, so that $\alpha\sin(2\omega+\theta)$ is obtained. The result, $\alpha\sin(\omega+\theta)$, is then stored in the register 15 after $\alpha\cos(2\omega+\theta)$ has been removed from the resistor 15 to the resistor 14.

When the above arithmetic operations are repeated m times, $\alpha\cos(m\omega+\theta)$ and $\alpha\sin(m\omega+\theta)$ are obtained. When m is an odd number, $\alpha\cos(m\omega+\theta)$ and $\alpha\sin(m\omega+\theta)$ are stored in the registers 13b and 13c, respectively. When m is an even number, on the other hand, $\alpha\cos(m\omega+\theta)$ and $\alpha\sin(m\omega+\theta)$ are stored in the registers 14 and 15, respectively. Thus, if the inputs to the multiplier 12 are latched in a timely manner, then a series of $\alpha\cos(m\omega+\theta)$ or $\alpha\sin(m\omega+\theta)$ will be entered into the D/A converter 21.

When the inputs of the multiplier 12 are latched at the times ($\phi$7) indicated in FIG. 15, the D/A converter 21 provides an analog sinusoidal wave represented by $$h=\alpha\sin[(\omega/Ts)t+\theta]$$

Figure 16:
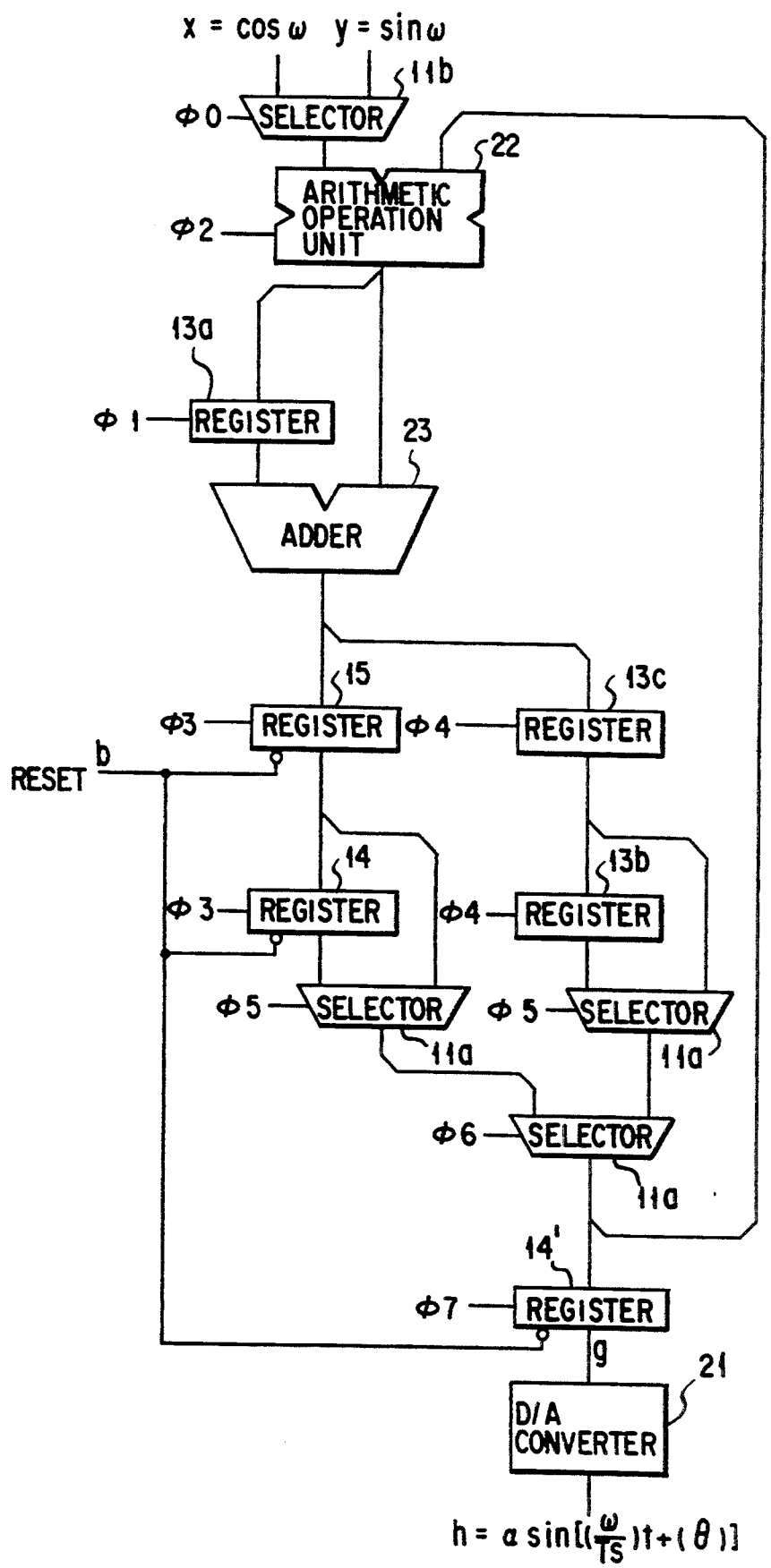
FIG. 16 is a block diagram of a digital sine-wave generating circuit according to a sixth embodiment of the present invention.

FIG. 16 is a block diagram of a digital sine-wave generating circuit according to a sixth embodiment of the present invention. In FIG. 16, 22 denotes an arithmetic means which outputs the product of two inputs as it is or with its sign reversed, and 23 denotes an adder. In FIG. 16, like reference numerals are used to denote corresponding parts to those in the fifth embodiment shown in FIG. 14.

As the arithmetic means in FIG. 16 such a circuit as shown in FIG. 10 or FIG. 11 can be used.

When operated at the times shown in FIG. 15, the digital sine-wave generating circuit of FIG. 16 can also generate a sinusoidal wave. That is, the circuit of FIG. 16 is substantially the same as the circuit of FIG. 14 in operation.

However, the circuit of FIG. 16 differs from the circuit of FIG. 14 in that no arithmetic operation of subtracting the result of multiplication from data stored in the register 13a is performed. That is, in the circuit of FIG. 16, such arithmetic operation is replaced by arithmetic operation of adding the result of multiplication with the sign reversed output from the arithmetic unit 22 to data stored in the register 13a.

For example, in the first arithmetic operation, $\alpha\cos\theta$ from the register 14 and $\cos\omega$ from the selector 11b are multiplied in the arithmetic unit 22 and the result, $\alpha\cos\theta\times\cos\omega$, is then stored in the register 13a. Next, in the arithmetic unit 22, $\alpha\sin\theta$ from the register 15 and $\sin\omega$ from the selector 11b are multiplied and the sign of the product is reversed, so that $-\alpha\sin\theta\times\sin\omega$ is output. Subsequently, $\alpha\cos\theta\times\cos\omega$ from the register 13a and $-\alpha\sin\theta\times\sin\omega$ from the arithmetic unit 22 are added together in the adder 23, thereby obtaining $\alpha\cos(\omega+\theta)$.

In the present embodiment as well, if the inputs to the arithmetic unit 22 are latched at appropriate times, a series of $\alpha\cos(m\omega+\theta)$ or $\alpha\sin(m\omega+\theta)$ (m=1, 2, 3 ...) will be entered into the D/A converter 21. Thus, by executing the latching of the inputs to the arithmetic unit 22 at the times ($\phi$7) shown in FIG. 15, the D/A converter 21 is permitted to produce an analog sinusoidal wave represented by $$h=\alpha\sin[(\omega/Ts)t+\theta]$$

Figure 17:
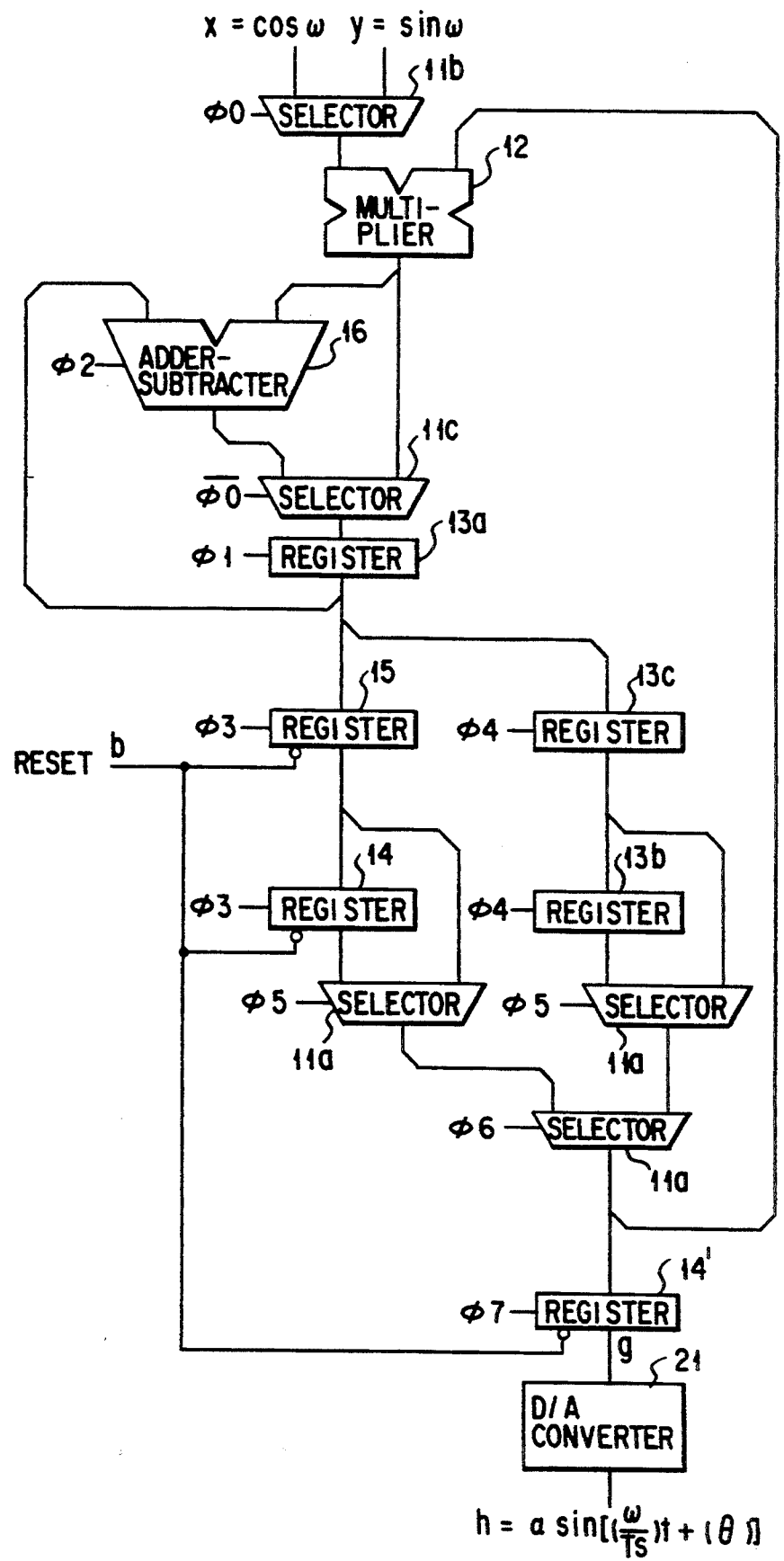
FIG. 17 is a block diagram of a digital sine-wave generating circuit according to a seventh embodiment of the present invention.

FIG. 17 is a block diagram of a digital sine-wave generating circuit according to a seventh embodiment of the present invention. In FIG. 17, like reference numerals are used to denote corresponding parts to those in the fifth embodiment shown in FIG. 14.

When operated at the times shown in FIG. 15, the digital sine-wave generating circuit of FIG. 17 can also generate a sinusoidal wave. That is, the circuit of FIG. 17 is the same as the circuit of FIG. 14 in operation.

Figure 18:
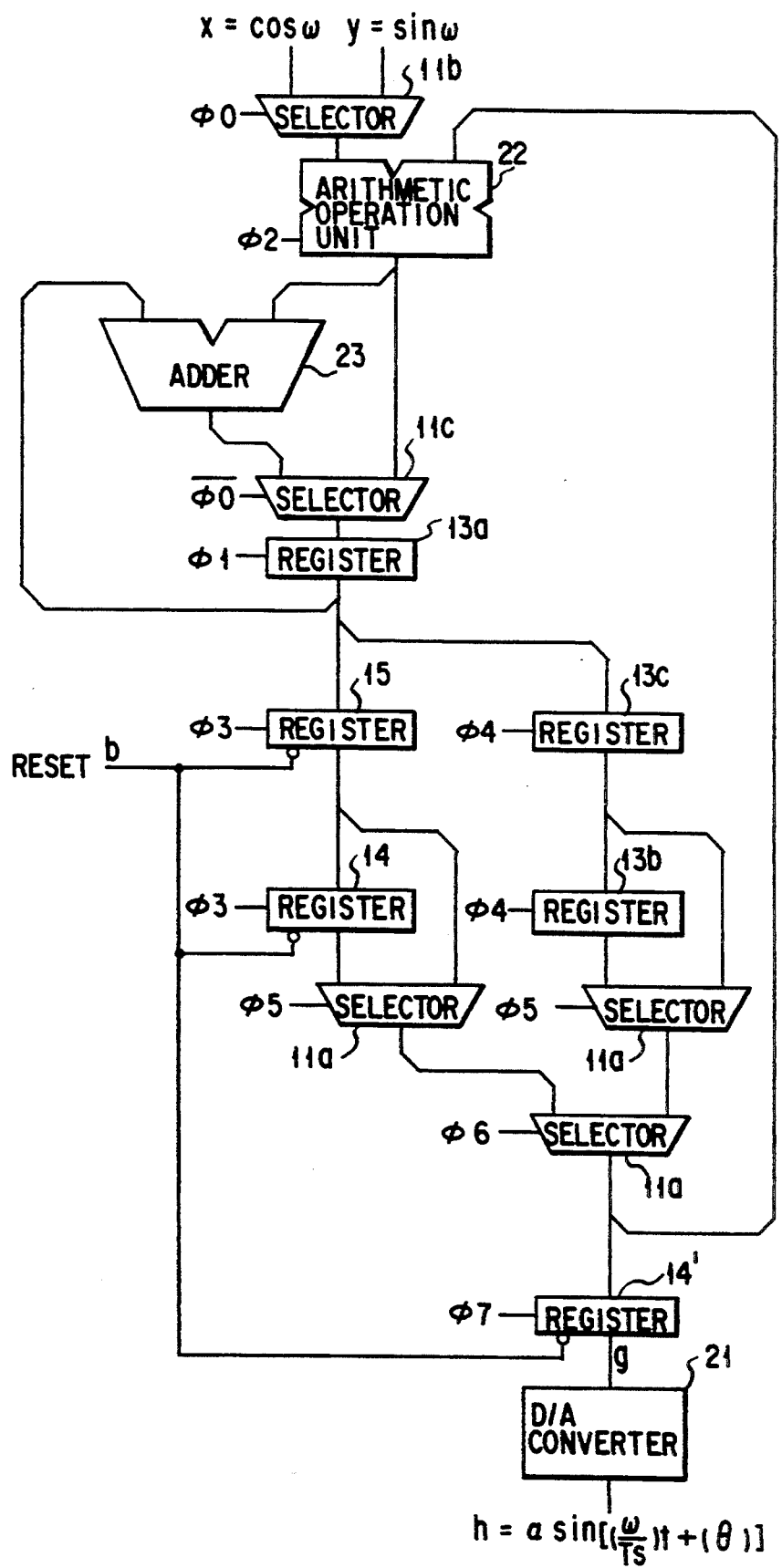
FIG. 18 is a block diagram of a digital sine-wave generating circuit according to an eighth embodiment of the present invention.

FIG. 18 is a block diagram of a digital sine-wave generating circuit according to an eighth embodiment of the present invention. In FIG. 18, like reference numerals are used to denote corresponding parts to those in the sixth embodiment shown in FIG. 16.

When operated at the times shown in FIG. 15, the digital sine-wave generating circuit of FIG. 18 can also generate a sinusoidal wave. That is, the circuit of FIG. 18 is the same as the circuit of FIG. 16 in operation.

Figure 19:
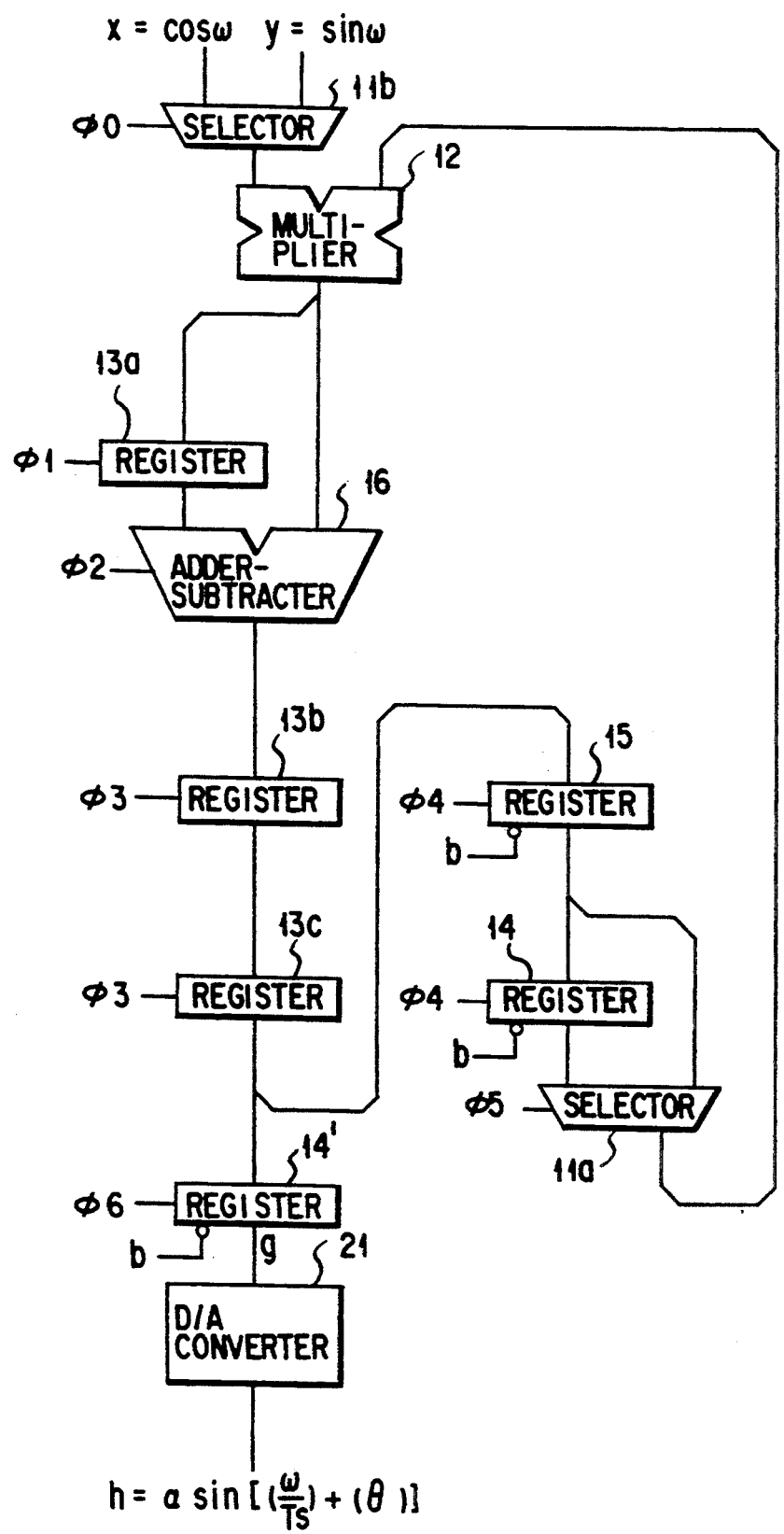
FIG. 19 is a block diagram of a digital sine-wave generating circuit according to a ninth embodiment of the present invention.

FIG. 19 is a block diagram of a digital sine-wave generating circuit according to a ninth embodiment of the present invention. In FIG. 19, like reference numerals are used to denote corresponding parts to those in the first embodiment shown in FIG. 5.

Figure 20:
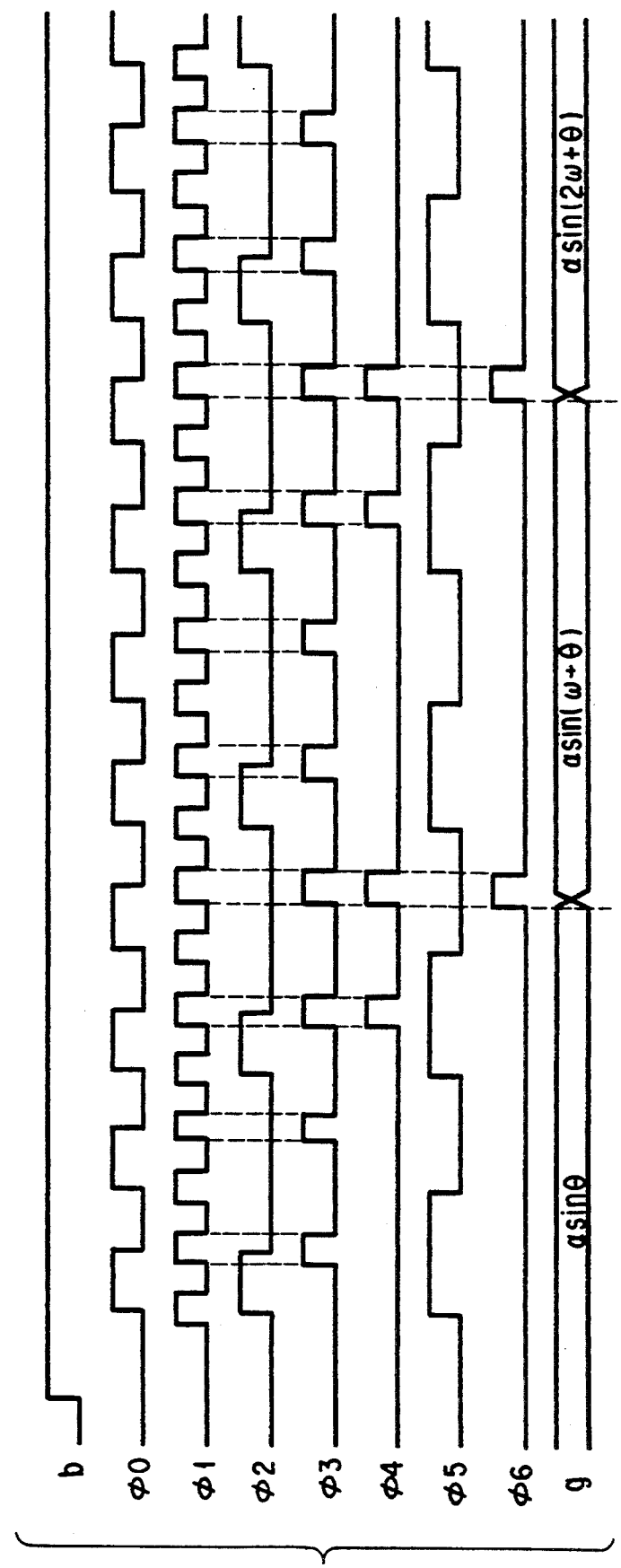
FIG. 20 is a timing diagram useful in understanding the operation of the circuit of FIG. 19.

FIG. 20 is a timing diagram of the digital sine-wave generating circuit of FIG. 19. The operation of this circuit will be described hereinafter.

First, a reset signal b is applied to the registers 14 and 15, so that they are set to their respective initial values $\alpha\cos\theta$ and $\alpha\sin\theta$.

Next, $\alpha\cos\theta$ and $\cos\omega$ are respectively supplied from the register 14 via the selector 11a and from the selector 11b to the multiplier 12 where $\alpha\cos\theta\times\cos\omega$ is calculated. The product is then stored in the register 13a. Next, the multiplier 12 is supplied with $\alpha\sin\theta$ from the register 15 via the selector 11a and with $\sin\omega$ from the selector 11b. The multiplier 12 then calculates $\alpha\sin\theta\times\sin\omega$.

Subsequently, the product, $\alpha\sin\theta\times\sin\omega$, is subtracted from the data, $\alpha\cos\theta\times\cos\omega$, stored in the register 13a in the adder-subtracter 16, thereby obtaining $\alpha\cos(\omega+\theta)$. The result is then stored in the register 13b.

Next, the multiplier 12 is supplied with $\alpha\sin\theta$ from the register 15 via the selector 11a and $\cos\omega$ from the selector 11b to thereby calculate $\alpha\sin\theta\times\cos\omega$. The product is then stored in the register 13a. Next, the multiplier 12 is supplied with $\alpha\cos\theta$ from the register 14 via the selector 11a and $\sin\omega$ from the selector 11b, so that $\alpha\cos\theta\times\sin\omega$ is calculated.

Subsequently, the product, $\alpha\cos\theta\times\sin\omega$, is added to the data, $\alpha\sin\theta\times\cos\omega$, stored in the register 13a in the adder-subtracter 16, thereby obtaining $\alpha\sin(\omega+\theta)$. The result, $\alpha\sin(\omega+\theta)$, is then stored in the register 13b after $\alpha\cos(\omega+\theta)$ has been moved from the register 13b to the register 13c. Thereafter, $\alpha\sin(\omega+\theta)$ in the register 13b is moved to the register 15, and $\alpha\cos(\omega+\theta)$ in the register 13c is moved to the register 14.

When the above arithmetic operations are repeated m times, $\alpha\cos(m\omega+\theta)$ and $\alpha\sin(m\omega+\theta)$ are respectively stored in the registers 13b and 13c or the registers 14 and 15. Thus, if the inputs to the multiplier 12 are latched in a timely manner, then a series of $\alpha\cos(m\omega+\theta)$ or $\alpha\sin(m\omega+\theta)$ will be entered into the D/A converter 21.

When the inputs of the multiplier 12 are latched at the times ($\phi$6) indicated in FIG. 20, the D/A converter 21 will provide an analog sinusoidal wave represented by $$h=\alpha\sin[(\omega/Ts)t+\theta]$$

Figure 21:
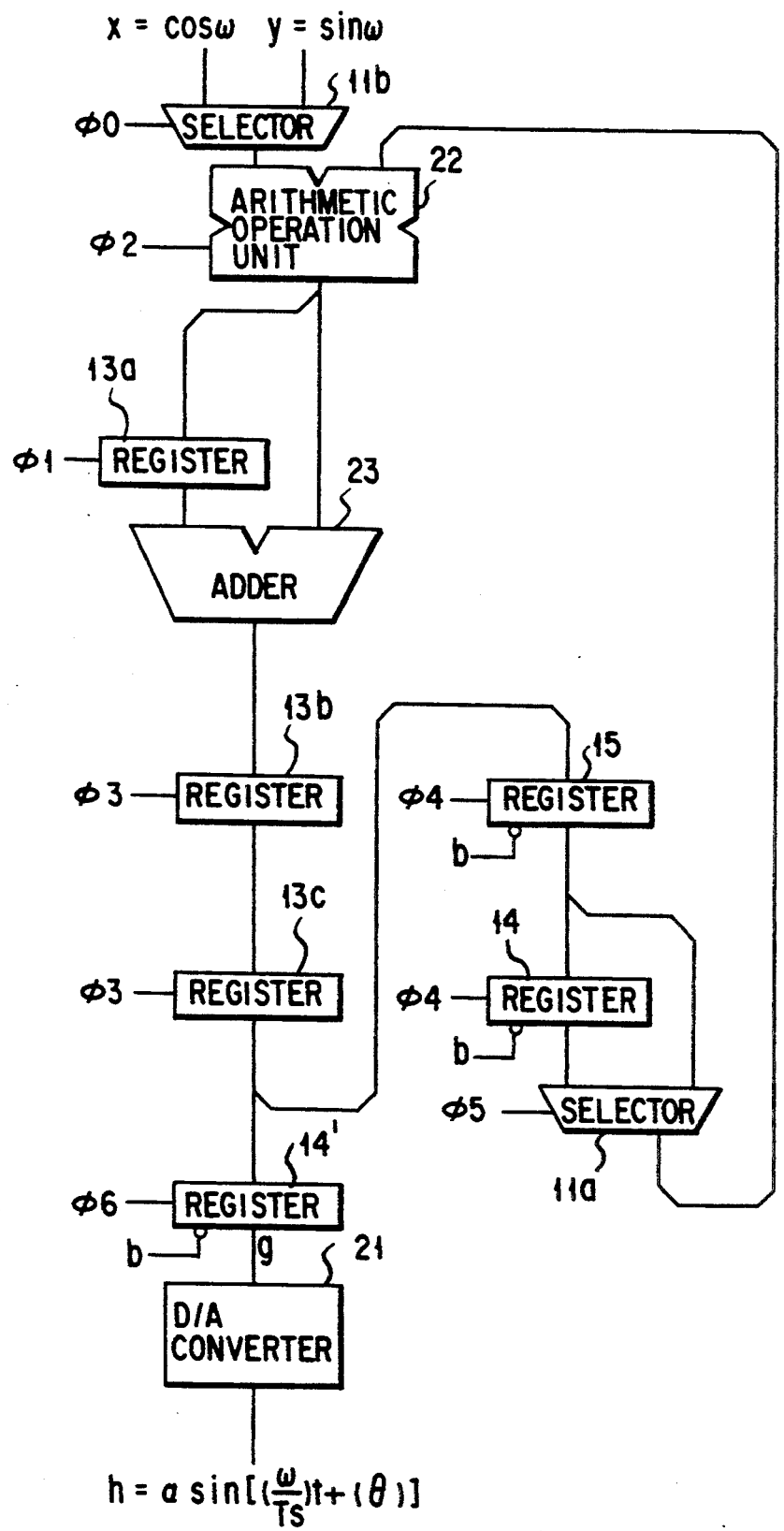
FIG. 21 is a block diagram of a digital sine-wave generating circuit according to a tenth embodiment of the present invention.

FIG. 21 is a block diagram of a digital sine-wave generating circuit according to a tenth embodiment of the present invention. In FIG. 21, 22 denotes an arithmetic means which outputs the product of two inputs as it is or with its sign reversed, and 23 denotes an adder. In FIG. 21, like reference numerals are used to denote corresponding parts to those in the ninth embodiment shown in FIG. 19.

As the arithmetic means in FIG. 21 such a circuit as shown in FIG. 10 or FIG. 11 can be used.

When operated at the times shown in FIG. 20, the digital sine-wave generating circuit of FIG. 21 can also generate a sinusoidal wave. That is, the circuit of FIG. 21 is substantially the same as the circuit of FIG. 19 in operation.

Unlike the circuit of FIG. 19, however, the circuit of FIG. 21 performs no arithmetic operation of subtracting the result of multiplication from data stored in the register 13a. That is, in the circuit of FIG. 21, such arithmetic operation is replaced by arithmetic operation of adding the result of multiplication with the sign reversed output from the arithmetic unit 22 to data stored in the register 13a.

For example, in the first arithmetic operation, $\alpha\cos\theta$ from the register 14 and $\cos\omega$ from the selector 11b are multiplied in the arithmetic unit 22 and the result, $\alpha\cos\theta\times\cos\omega$, is then stored in the register 13a. Next, in the arithmetic unit 22, $\alpha\sin\theta$ from the register 15 and $\sin\omega$ from the selector 11b are multiplied and the sign of the product is reversed, so that $-\sin\theta\times\sin\omega$ is output. Subsequently, $\alpha\cos\theta\times\cos\omega$ from the register 13a and $-\alpha\sin\theta\times\sin\omega$ from the arithmetic unit 22 are added together in the adder 23, thereby obtaining $\alpha\cos(\omega+\theta)$.

In the present embodiment as well, if the inputs to the arithmetic unit 22 are latched at appropriate times, a series of $\alpha\cos(m\omega+\theta)$ or $\alpha\sin(m\omega+\theta)$ (m=1, 2, 3 ...) will be entered into the D/A converter 21. Thus, by executing the latching of the inputs to the arithmetic unit 22 at the times ($\phi$6) shown in FIG. 20, the D/A converter 21 is permitted to produce an analog sinusoidal wave represented by $$h=\alpha\sin[(\omega/Ts)t+\theta]$$

FIG. 22 is a block diagram of a digital sine-wave generating circuit according to an eleventh embodiment of the present invention. In FIG. 22, like reference numerals are used to denote corresponding parts to those in the ninth embodiment shown in FIG. 19.

When operated at the times shown in FIG. 20, the digital sine-wave generating circuit of FIG. 22 can also generate a sinusoidal wave. That is, the circuit of FIG. 22 is the same as the circuit of FIG. 19 in operation.

FIG. 23 is a block diagram of a digital sine-wave generating circuit according to a twelfth embodiment of the present invention. In FIG. 23, like reference numerals are used to denote corresponding parts to those in the tenth embodiment shown in FIG. 21.

When operated at the times shown in FIG. 20, the digital sine-wave generating circuit of FIG. 23 can also generate a sinusoidal wave. That is, the circuit of FIG. 23 is the same as the circuit of FIG. 21 in operation.

Figure 24:
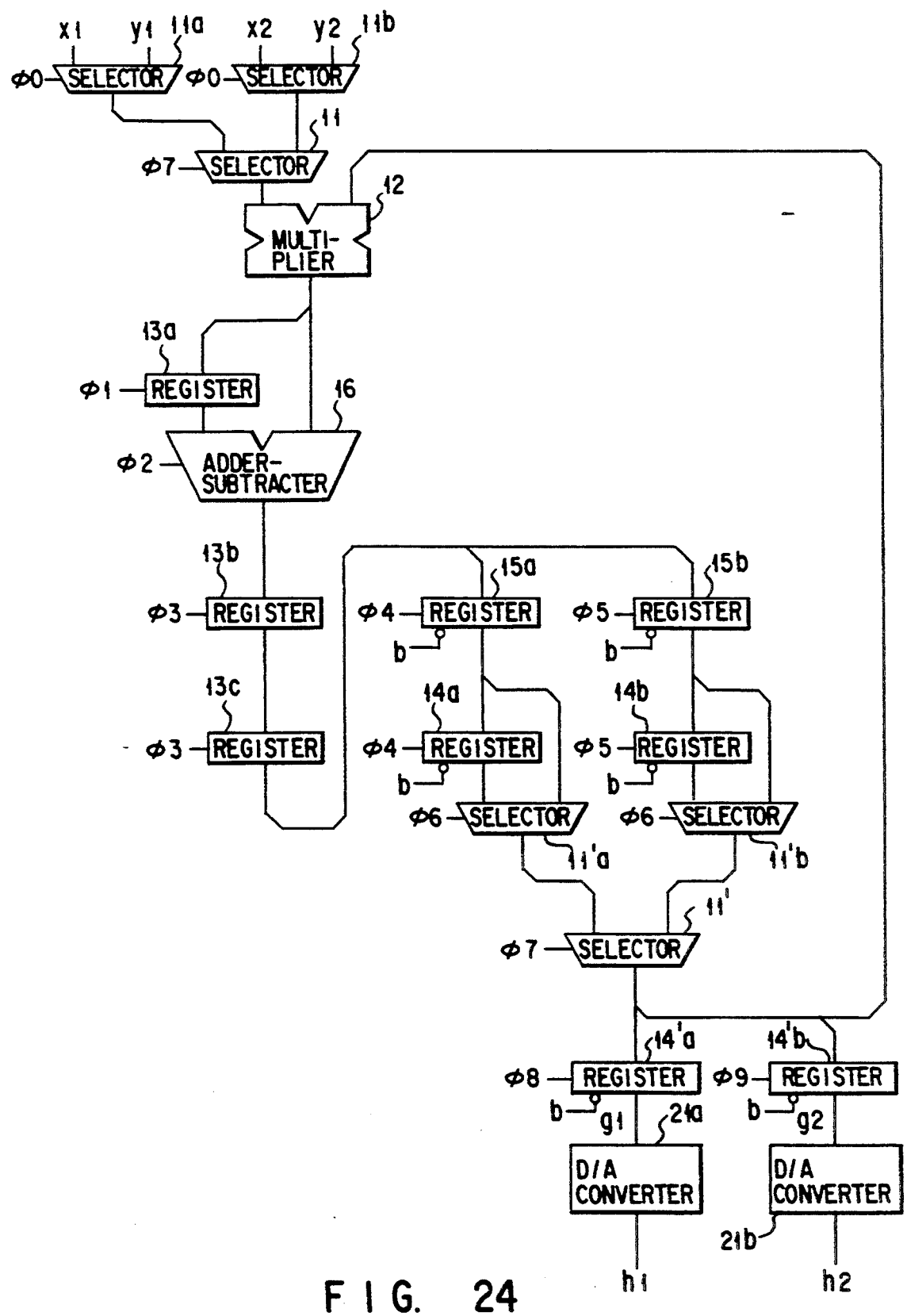
FIG. 24 is a block diagram of a digital sine-wave generating circuit according to a thirteenth embodiment of the present invention.

FIG. 24 is a block diagram of a digital sine-wave generating circuit according to a thirteenth embodiment of the present invention. In FIG. 24, like reference numerals are used to denote corresponding parts to those in the ninth embodiment shown in FIG. 19.

Figure 25:
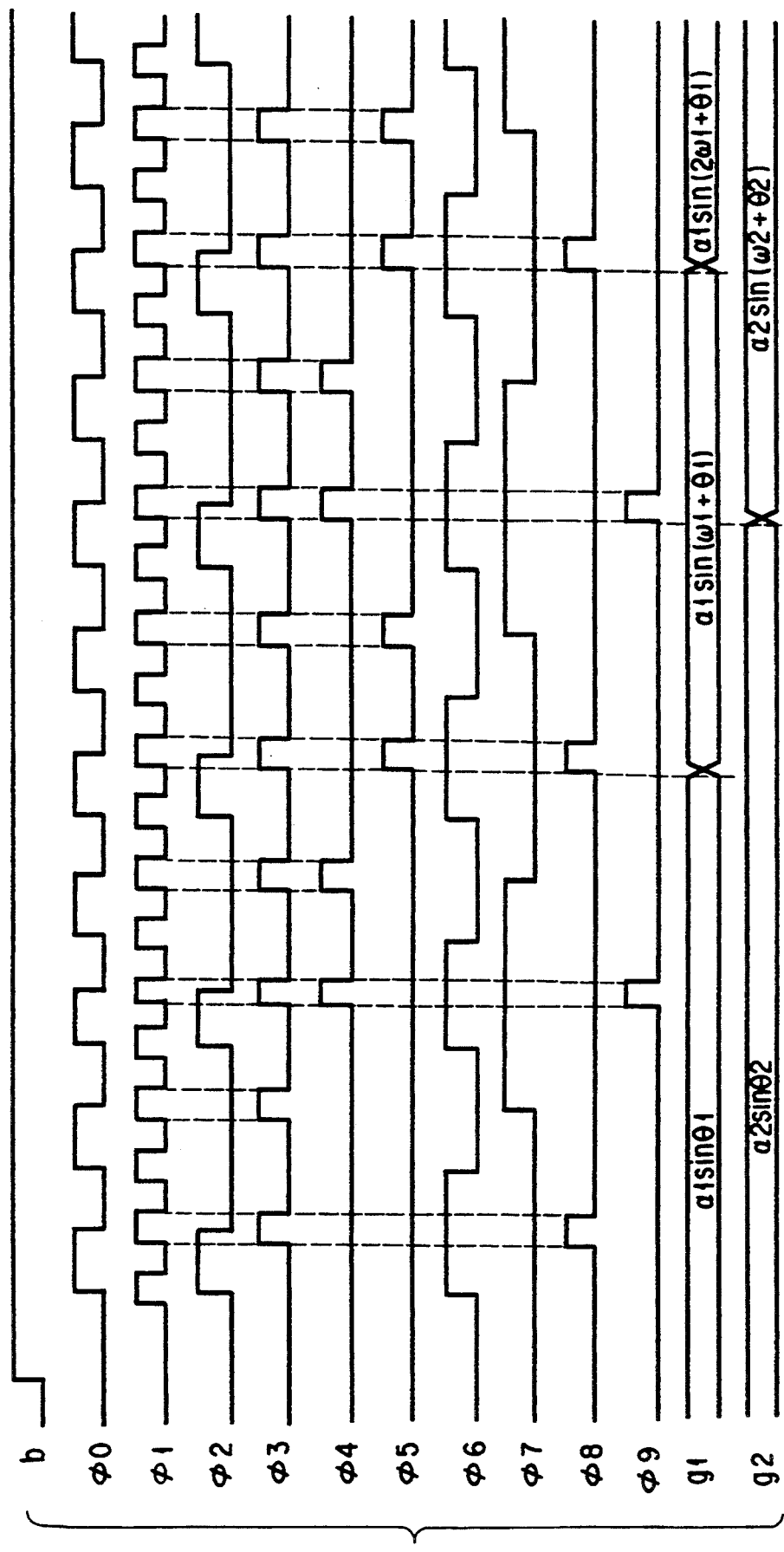
FIG. 25 is a timing diagram useful in understanding the operation of the circuit of FIG. 24.

FIG. 25 is a timing diagram of the digital sinewave generating circuit shown in FIG. 24. That is, the circuit of FIG. 25 is the same as the circuit of FIG. 19 in operation except that two sinusoidal waves can be generated simultaneously.

Figure 26:
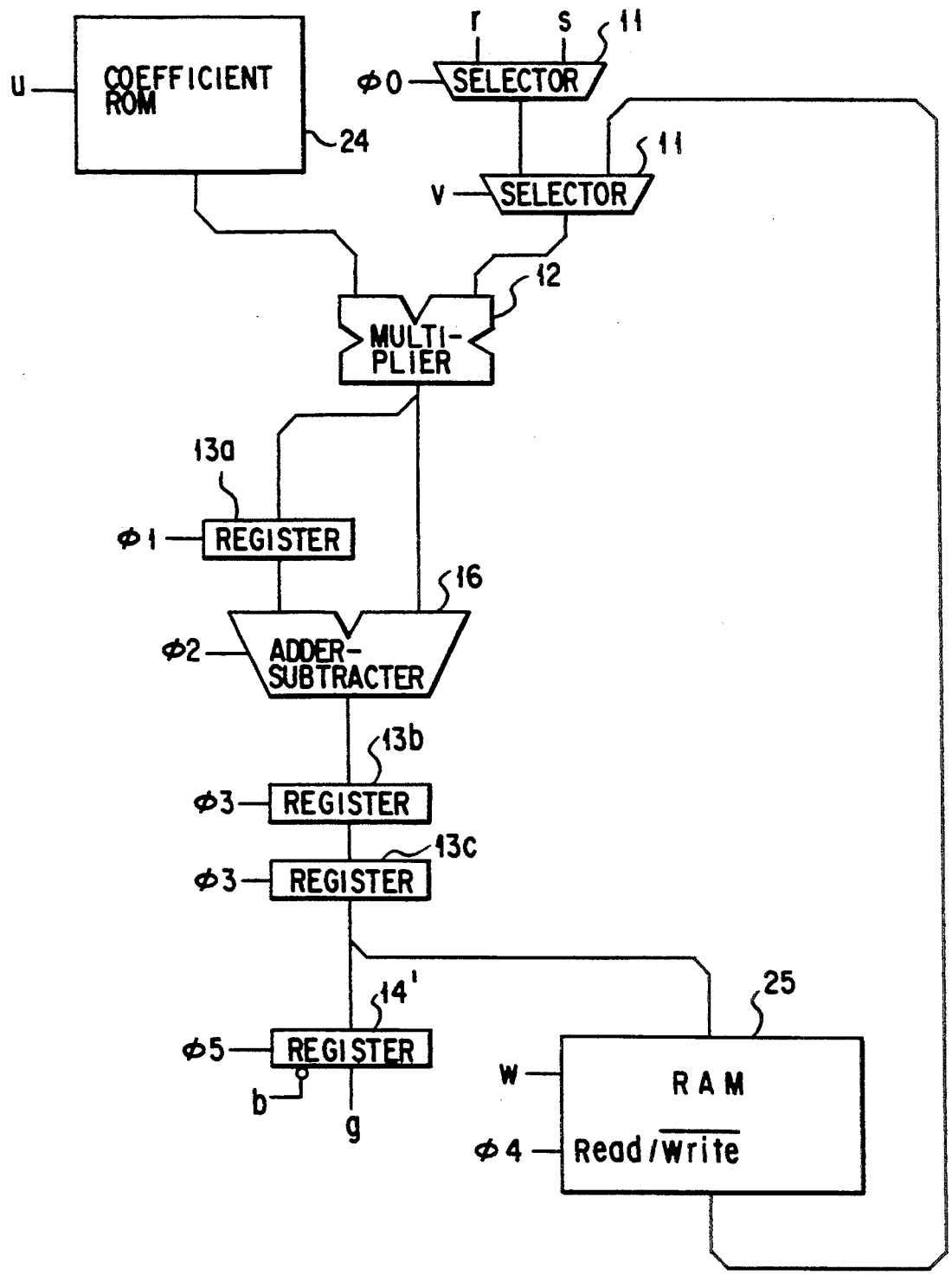
FIG. 26 is a block diagram of a digital sine-wave generating circuit according to a fourteenth embodiment of the present invention.

FIG. 26 is a block diagram of a digital sine-wave generating circuit according to a fourteenth embodiment of the present invention. In FIG. 26, 24 denotes a coefficient ROM and 25 denotes a random access memory (hereinafter abbreviated to RAM). In FIG. 26, like reference numerals are used to denote corresponding parts to those in the first embodiment shown in FIG. 5.

Figure 27:
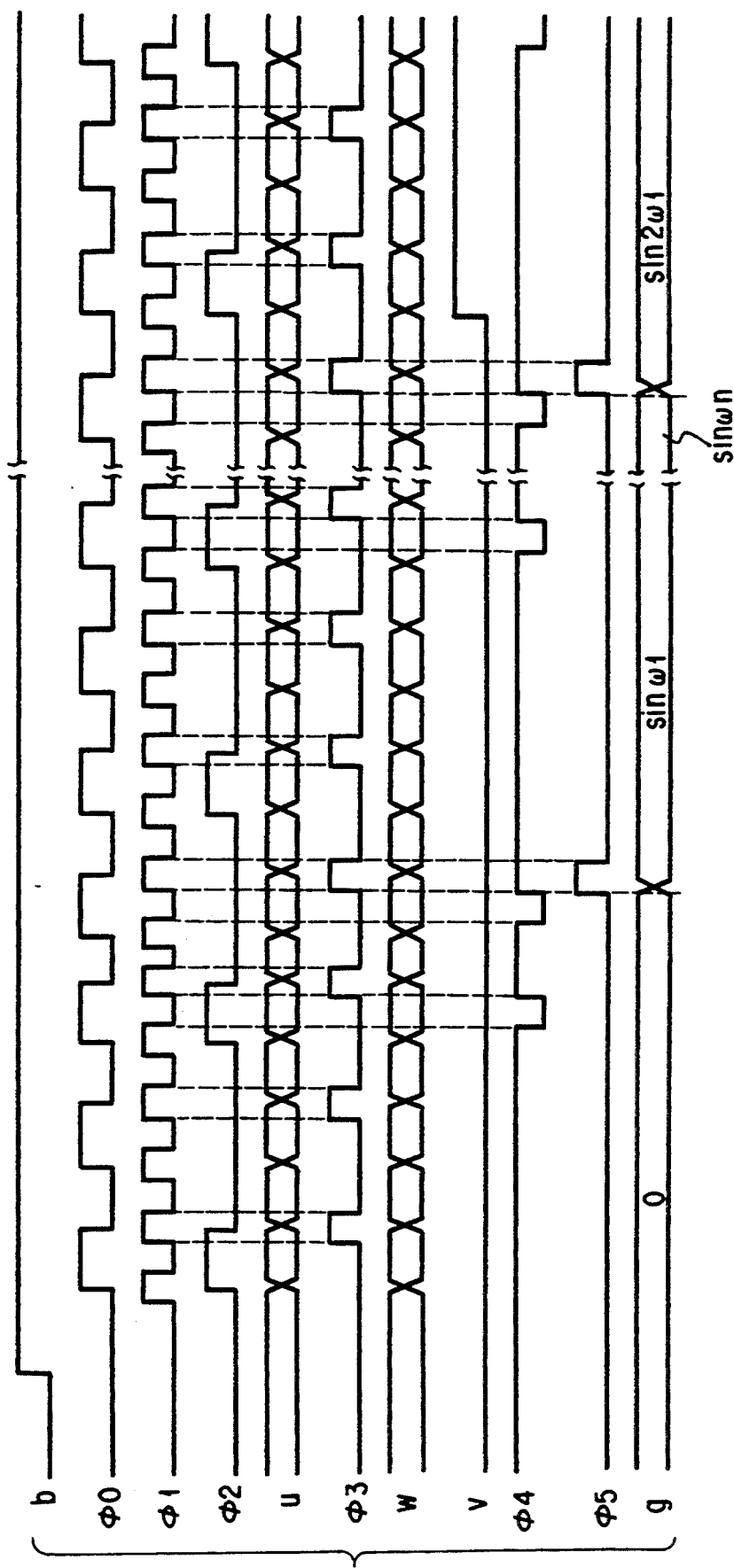
FIG. 27 is a timing diagram useful in understanding the operation of the circuit of FIG. 26.

FIG. 27 is a timing diagram of the digital sine-wave generating circuit of FIG. 26. The operation of this circuit will be described hereinafter.

The present embodiment is adapted to generate a number of sinusoidal waves simultaneously. In the coefficient ROM 24 have been stored previously values (sin $\omega k$ and cos $\omega k$) representing the sine and cosine of the digital angular frequency $\omega k$ ($k=1, 2, \ldots, n$) of a sine wave to be generated, The storage capacity required of the ROM 24 is 2n words when the number of sine waves to be generated is n.

In FIG. 26, r and s are initial values which are common to all of sinusoidal waves ($r = \cos 0°$, $s = \sin 0°$). The ROM 25 stores values of the sine and cosine of the results of operations (sin $m\omega k$ and cos $m\omega k$). As with the coefficient ROM 24, the storage capacity required of the ROM 25 is 2n words when the number of sinusoidal waves to be generated is n.

A control signal v is kept a 0 until the first sample is operated on for all the frequencies. The control signal v is then raised to a 1, so that cumulative multiplication of complex numbers is executed. A signal u is an address signal for the ROM 24, and a signal w is an address signal for the RAM 25. In this example, the registers 13b and 13c can be omitted. In this case, the storage capacity required of the RAM 25 would be 4n words when the number of sinusoidal waves to be generated is n.

FIG. 28 is a block diagram of a digital sine-wave generating circuit according to a fifteenth embodiment of the present invention. In FIG. 28, 22 denotes an arithmetic means which outputs the product of two inputs as it is or with its sign reversed, and 23 denotes an adder. In FIG. 28, like reference numerals are used to denote corresponding parts to those in the fourteenth embodiment shown in FIG. 26. As the arithmetic means in FIG. 28 such a circuit as shown in FIG. 10 or FIG. 11 can be used.

When operated at the times shown in FIG. 27, the digital sine-wave generating circuit of FIG. 28 can also generate a sinusoidal wave. However, the circuit of FIG. 28 differs from the circuit of FIG. 26 in that no arithmetic operation of subtracting the result of multiplication from data stored in the register 13a is performed. That is, in the circuit of FIG. 28, such arithmetic operation is replaced by arithmetic operation of adding the result of multiplication output from the arithmetic unit 22 with its sign reversed to data stored in the register 13a.

In the present embodiment as well, the registers 13b and 13c may be omitted.

Figure 29:
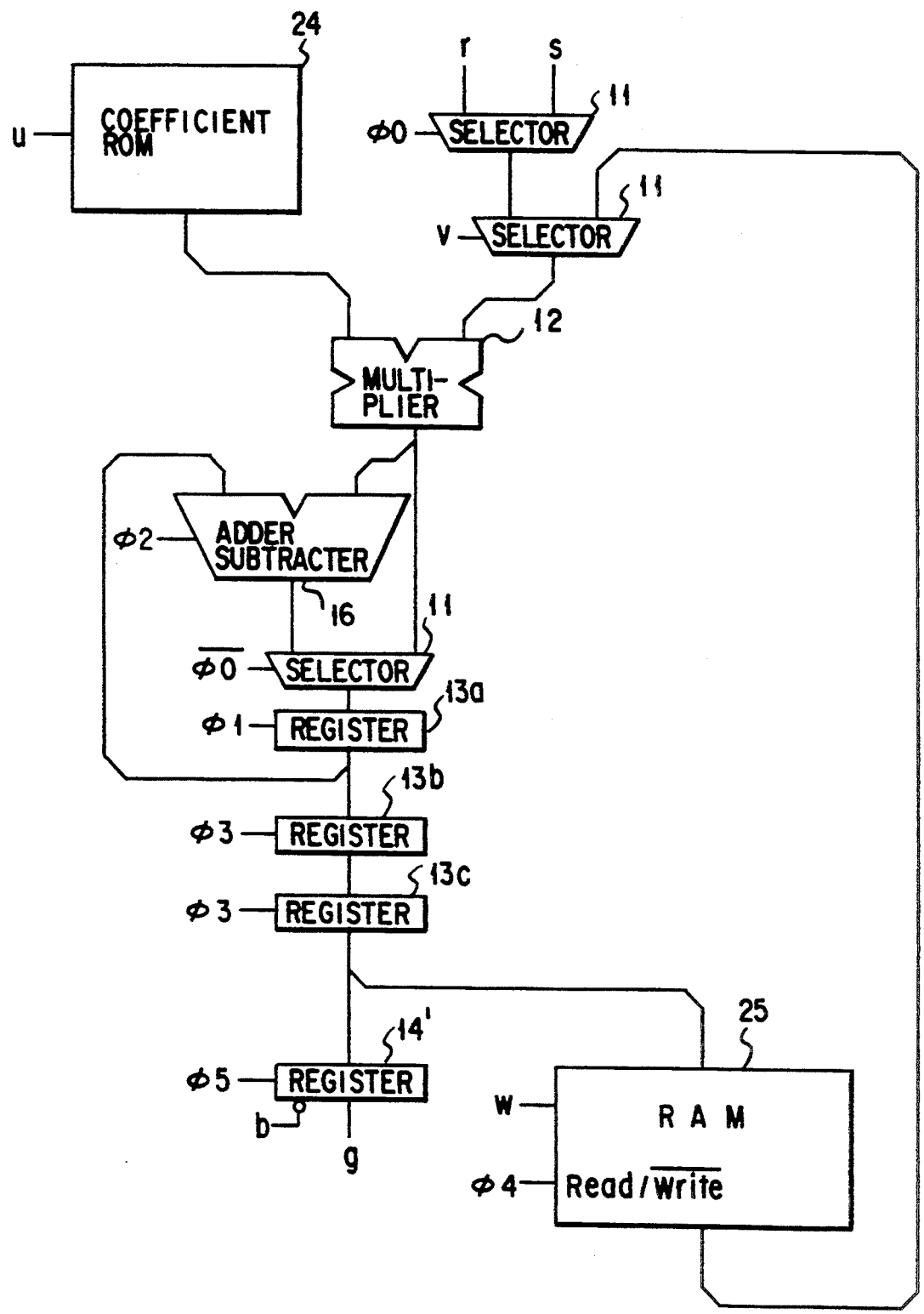
FIG. 29 is a block diagram of a digital sine-wave generating circuit according to a sixteenth embodiment of the present invention.

FIG. 29 is a block diagram of a digital sine-wave generating circuit according to a sixteenth embodiment of the present invention. In FIG. 29, like reference numerals are used to denote corresponding parts to those in the fourteenth embodiment shown in FIG. 26.

When operated at the times shown in FIG. 27, the digital sine-wave generating circuit of FIG. 29 can also generate a sinusoidal wave. That is, the circuit of FIG. 29 is the same as the circuit of FIG. 26 in operation.

FIG. 30 is a block diagram of a digital sine-wave generating circuit according to a seventeenth embodiment of the present invention. In FIG. 30, like reference numerals are used to denote corresponding parts to those in the fifteenth embodiment shown in FIG. 28.

When operated at the times shown in FIG. 27, the digital sine-wave generating circuit of FIG. 30 can also generate a sinusoidal wave. That is, the circuit of FIG. 30 is the same as the circuit of FIG. 28 in operation.

In the circuits shown in FIGS. 29 and 30 as well, the registers 13b and 13c can be omitted.

Figure 31:
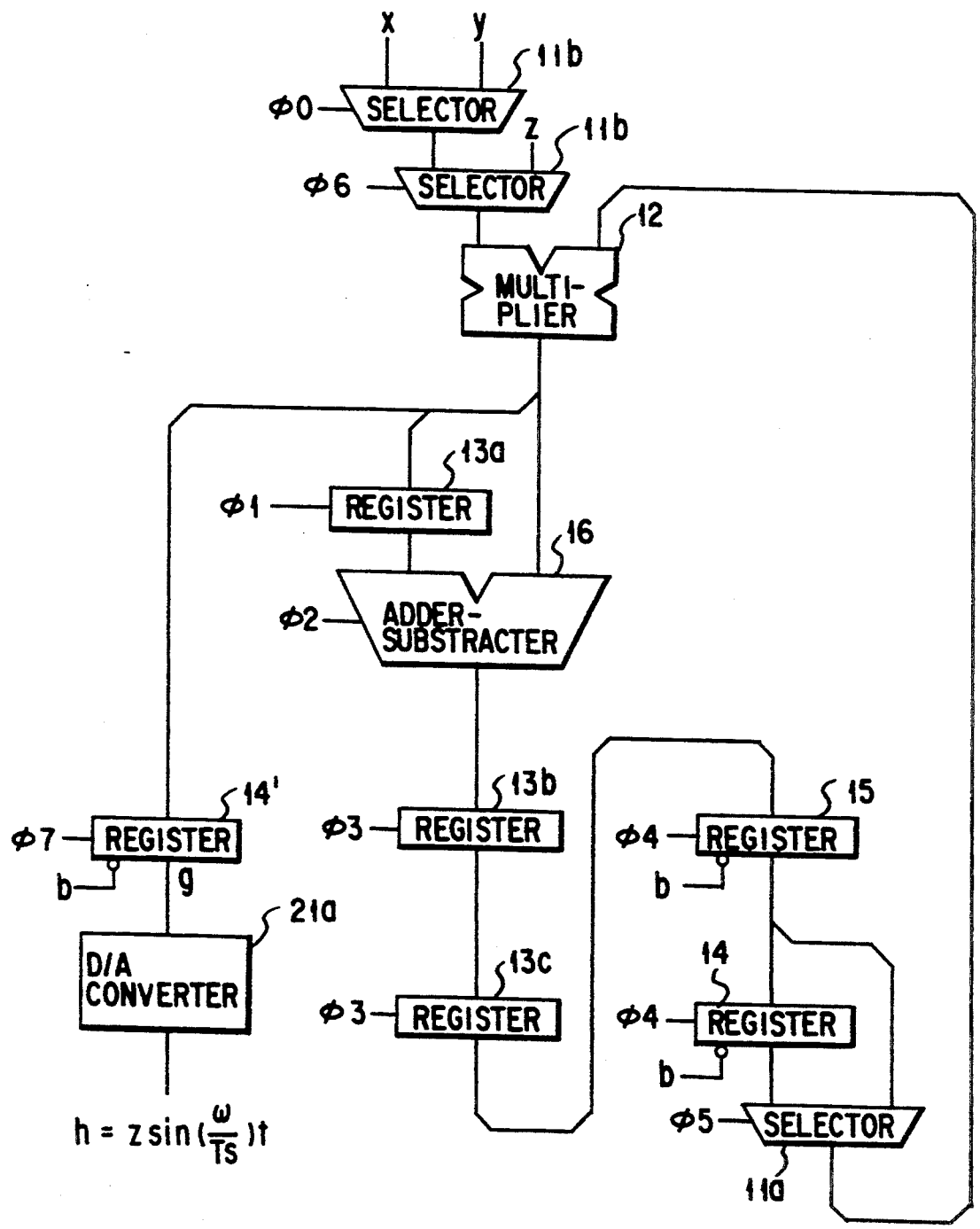
FIG. 31 is a block diagram of a digital sine-wave generating circuit according to an eighteenth embodiment of the present invention.

FIG. 31 is a block diagram of a digital sine-wave generating circuit according to an eighteenth embodiment of the present invention. In FIG. 31, like reference numerals are used to denote corresponding parts to those in the first embodiment shown in FIG. 5.

Figure 32:
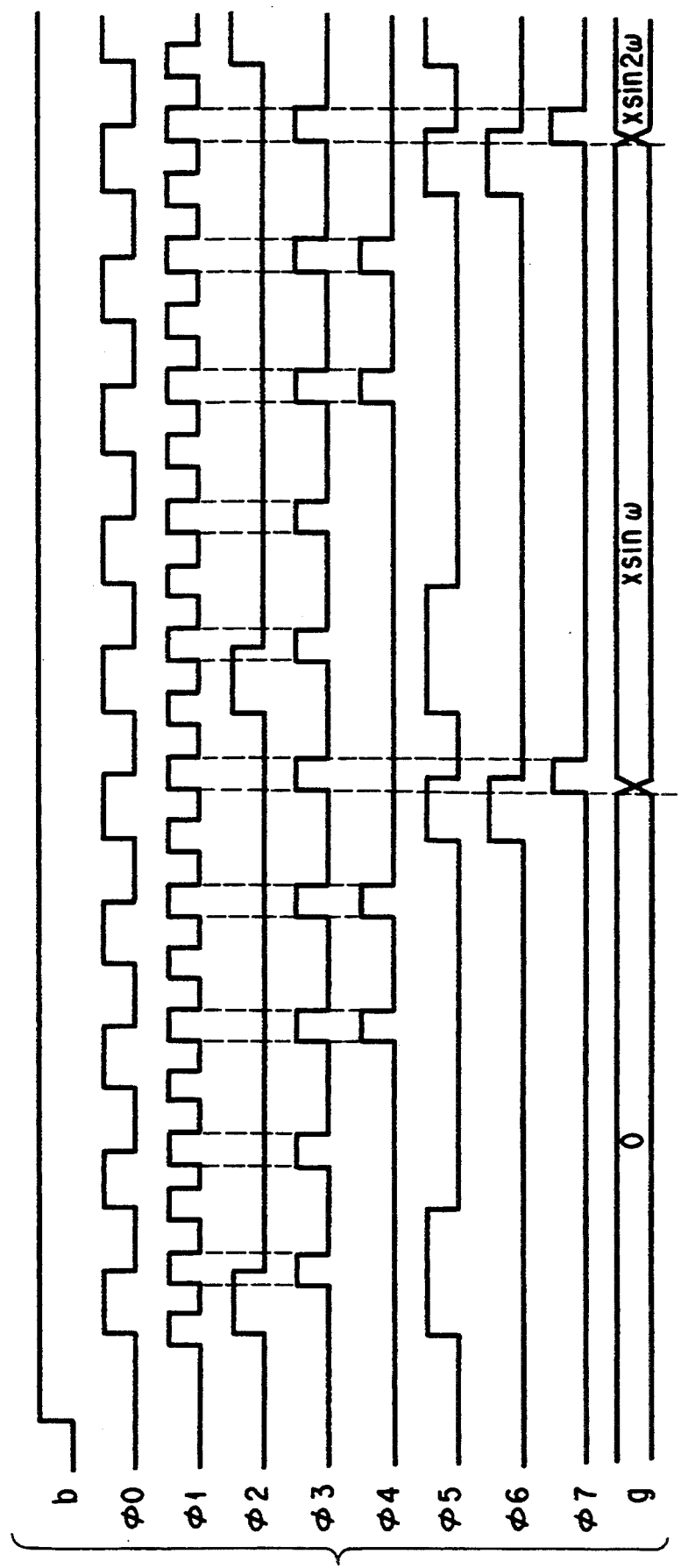
FIG. 32 is a timing diagram useful in understanding the operation of FIG. 31.

FIG. 32 is a timing diagram of the digital sine-wave generating circuit shown in FIG. 31.

The present embodiment is adapted to vary the amplitude of an output sinusoidal wave. In multiplier 12, a digital sinusoidal wave calculated is multiplied by amplitude data z. As in this embodiment, the multiple use of the multiplier 12 permits the amplitude of an output sinusoidal wave to be varied easily.

Figure 33:
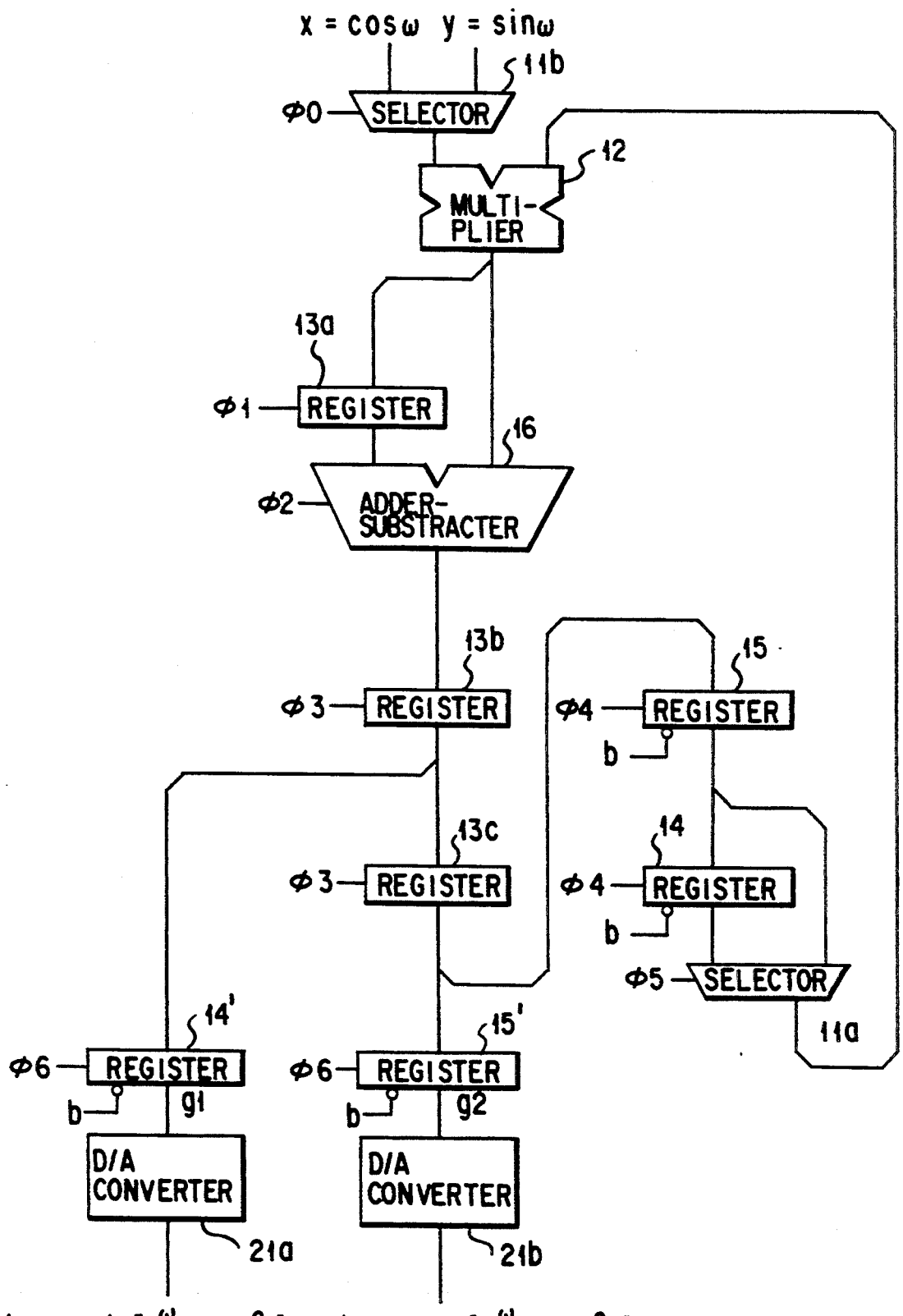
FIG. 33 is a block diagram of a digital sine-wave generating circuit according to a nineteenth embodiment of the present invention.

FIG. 33 is a block diagram of a digital sine-wave generating circuit according to a nineteenth embodiment of the present invention. In FIG. 33, like reference numerals are used to denote corresponding parts to those in the ninth embodiment shown in FIG. 19.

Figure 34:
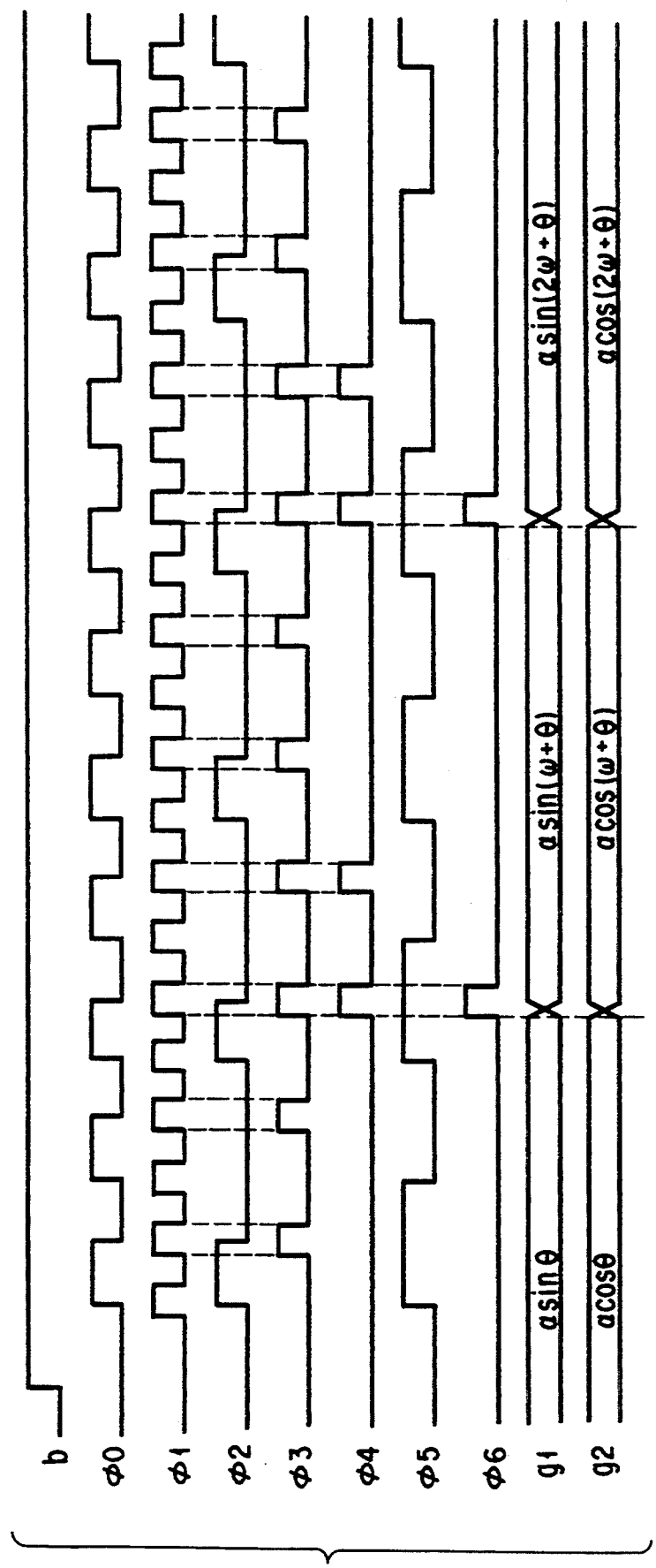
FIG. 34 is a timing diagram useful in understanding the operation of the circuit of FIG. 33.

FIG. 34 is a timing diagram of the digital sine-wave generating circuit shown in FIG. 33.

The present embodiment is directed to a digital sine-wave generating circuit which can simultaneously generate a plurality of sinusoidal waves whose phase angles are 90-degree apart. According to the present embodiment, a plurality of sinusoidal waves which are 90-degree apart in phase can be obtained simultaneously without special means.

The digital sine-wave generating circuits of the present invention have the following advantages.

a. Since the digital angular frequency $\omega$ is an analog quantity, the frequency of a sinusoidal wave can be set to any value. This advantage is especially significant in using floating-point arithmetic.

b. Since a large capacity ROM is not needed, the area occupied by the circuit is small.

c. When a multiplier used is of a parallel type, the circuits of the present invention can operate with clocks whose frequency is four to eight times the sampling rate. This eliminates the need for high-frequency clocks that conventional circuits required.

d. A number of sinusoidal waves can be generated using a small-capacity memory. Moreover, the amplitude of a sinusoidal wave can be varied freely. Further-more, since a plurality of sinusoidal waves which are 90-degree apart in phase can always be generated, they can be output to outside for utilization.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A digital sine-wave generating circuit for generating a sinusoidal wave by performing arithmetic operations on complex numbers, comprising:
    multiplying means for performing predetermined operations of multiplication on the sine (sin $\omega$) or cosine (cos $\omega$) of a digital angular frequency $\omega$;
    first storage means for storing a first output of said multiplying means;
    adder-subtracter means coupled to said first storage means and said multiplying means for performing arithmetic addition or subtraction of an output of said first storage means and a second output of said multiplying means; and
    second storage means for storing an output of said adder-subtracter means.

2. A digital sine-wave generating circuit according to claim 1, wherein said predetermined operations of multiplication by said multiplying means includes arithmetic multiplication of predetermined initial values by said sine or cosine and arithmetic multiplication of said output of said adder-subtracter means in said second storage means by said sine or cosine.

3. A digital sine-wave generating circuit according to claim 2, wherein said second storage means comprises two pairs of storage circuits which store said initial values and said output of said adder-subtracter means alternately.

4. A digital sine-wave generating circuit according to claim 3, wherein said storage circuits are all connected in parallel.

5. A digital sine-wave generating circuit according to claim 3, wherein two storage circuits in each pair are connected in series with each other, and said pairs are connected in parallel with each other.

6. A digital sine-wave generating circuit according to claim 3, wherein said storage circuits are all connected in series.

7. A digital sine-wave generating circuit according to claim 3, further comprising selector means for selecting one of said storage circuits and providing data stored in a selected storage circuit to said multiplying means.

8. A digital sine-wave generating circuit according to claim 3, further comprising third storage means for storing sine and cosine values of digital angular frequencies and providing the sine (sin $\omega$k) and cosine (cos $\omega$k) of an arbitrary digital angular frequency $\omega$k (k=1, 2, .., n) to said multiplying means.

9. A digital sine-wave generating circuit according to claim 1, further comprising third storage means for latching said output of said adder-subtracter means at predetermined times to apply a series of outputs of said adder-subtracter means.

10. A digital sine-wave generating circuit according to claim 1, further comprising selector means for selectively outputting said first or second output of said multiplying means and said output of said adder-subtracter means.

11. A digital sine-wave generating circuit according to claim 1, wherein said second storage means includes a RAM for accumulating outputs of said adder-subtracter means.

12. A digital sine-wave generating circuit for generating a sinusoidal wave by performing arithmetic operations on complex numbers, comprising:
    arithmetic means for performing predetermined arithmetic operations on the sine (sin $\omega$) or cosine (cos $\omega$) of a digital angular frequency $\omega$, said arithmetic means being capable of reversing the sign of the result of multiplication;
    first storage means for storing a first output of said arithmetic means;
    adder means coupled to said first storage means and said arithmetic means for performing arithmetic addition of said first output in said first storage means and a second output of said arithmetic means; and
    second storage means for storing an output of said adder means.

13. A digital sine-wave generating circuit according to claim 12, wherein said predetermined arithmetic operations by said arithmetic means includes arithmetic multiplication of predetermined initial values by said sine or cosine or inversion of the sign of the result of said multiplication, and arithmetic multiplication of said output of said adder means in said second storage means by said sine or cosine or inversion of the sign of the result of said multiplication.

14. A digital sine-wave generating circuit according to claim 13, wherein said second storage means comprises two pairs of storage circuits which store said initial values and said output of said adder means alternately.

15. A digital sine-wave generating circuit according to claim 14, wherein said storage circuits are all connected in parallel.

16. A digital sine-wave generating circuit according to claim 14, wherein two storage circuits in each pair are connected in series with each other, and said pairs are connected in parallel with each other.

17. A digital sine-wave generating circuit according to claim 14, wherein said storage circuits are all connected in series.

18. A digital sine-wave generating circuit according to claim 14, further comprising selector means for selecting one of said storage circuits and providing data stored in a selected storage circuit to said arithmetic means.

19. A digital sine-wave generating circuit according to claim 14, further comprising third storage means for storing sine and cosine values of digital angular frequencies and providing the sine (sin $\omega$k) and cosine (cos $\omega$k) of an arbitrary digital angular frequency $\omega$k (k=1, 2, .., n) to said arithmetic means.

20. A digital sine-wave generating circuit according to claim 14, wherein said second storage means includes a RAM for accumulating outputs of said adder means.

21. A digital sine-wave generating circuit according to claim 12 further comprising third storage means for latching said output of said adder means at predetermined times to apply a series of outputs of said adder means.

22. A digital sine-wave generating circuit according to claim 12, further comprising selector means for selectively outputting said first or second output of said arithmetic means and said output of said adder means.

* * * * *